(12) United States Patent
Park et al.

(10) Patent No.: US 10,912,130 B2
(45) Date of Patent: Feb. 2, 2021

(54) ELECTRONIC DEVICE AND TETHERING CONNECTION ESTABLISHMENT METHOD THEREOF

(71) Applicant: Samsung Electronics Co., Ltd., Gyeonggi-do (KR)

(72) Inventors: Chan-Yeol Park, Gyeonggi-do (KR); Han-Jib Kim, Gyeonggi-do (KR); Yong-Joon Jeon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/477,108

(22) PCT Filed: Jan. 23, 2018

(86) PCT No.: PCT/KR2018/000981
§ 371 (c)(1),
(2) Date: Jul. 10, 2019

(87) PCT Pub. No.: WO2018/139824
PCT Pub. Date: Aug. 2, 2018

(65) Prior Publication Data
US 2019/0357277 A1 Nov. 21, 2019

(30) Foreign Application Priority Data
Jan. 24, 2017 (KR) .................. 10-2017-0011242

(51) Int. Cl.
*H04W 76/10* (2018.01)
*H04B 7/26* (2006.01)
(Continued)

(52) U.S. Cl.
CPC ............. *H04W 76/10* (2018.02); *H04B 7/26* (2013.01); *H04W 48/18* (2013.01); *H04W 88/08* (2013.01)

(58) Field of Classification Search
None
See application file for complete search history.

(56) References Cited

U.S. PATENT DOCUMENTS

2012/0240197 A1* 9/2012 Tran ....................... H04W 12/08
726/4
2015/0103708 A1* 4/2015 Kang ................ H04W 52/0235
370/311
(Continued)

FOREIGN PATENT DOCUMENTS

JP 2015186214 10/2015
KR 1020120070344 6/2012
(Continued)

OTHER PUBLICATIONS

PCT/ISA/210 Search Report issued on PCT/KR2018/000981, pp. 5.
PCT/ISA/237 Written Opinion issued on PCT/KR2018/000981, pp. 6.

*Primary Examiner* — Xavier S Wong
(74) *Attorney, Agent, or Firm* — The Farrell Law Firm, P.C.

(57) ABSTRACT

According to various embodiments, an electronic device may comprise: a communication circuit comprising multiple communication interfaces; a processor electrically connected to the multiple communication modules, and a memory electrically connected to the processor, wherein the memory stores instructions that, when executed, cause the processor to: receive, from an external electronic device, information related to the external electronic device; select a communication interface to be used for tethering among the multiple communication interfaces, on the basis of at least a part of the received information; and establish a tethering connection with the external electronic device through the selected communication interface. Various embodiments are possible.

12 Claims, 12 Drawing Sheets

(51) Int. Cl.
*H04W 48/18* (2009.01)
*H04W 88/08* (2009.01)

(56) References Cited

U.S. PATENT DOCUMENTS

| | | | |
|---|---|---|---|
| 2015/0304800 A1* | 10/2015 | Son | H04B 7/24 455/41.2 |
| 2015/0351004 A1 | 12/2015 | Ko et al. | |
| 2016/0066248 A1* | 3/2016 | Sato | H04W 76/10 370/315 |
| 2016/0112939 A1* | 4/2016 | Senese | H04B 7/26 370/329 |
| 2016/0198290 A1 | 7/2016 | Hong et al. | |
| 2016/0278006 A1* | 9/2016 | Lee | H04W 48/18 |
| 2018/0020504 A1 | 1/2018 | Lee et al. | |

FOREIGN PATENT DOCUMENTS

| | | |
|---|---|---|
| KR | 1020140054914 | 5/2014 |
| KR | 1020150026263 | 3/2015 |
| KR | 101581708 | 12/2015 |
| KR | 101605260 | 3/2016 |
| KR | 1020160084693 | 7/2016 |

* cited by examiner

ELECTRONIC DEVICE AND TETHERING CONNECTION ESTABLISHMENT METHOD THEREOF

PRIORITY

This application is a National Phase Entry of PCT International Application No. PCT/KR2018/000981, which was filed on Jan. 23, 2018, and claims priority to Korean Patent Application No. 10-2017-0011242, which was filed on Jan. 24, 2017, the content of each of which is incorporated herein by reference.

BACKGROUND

1. Field

Various embodiments of the disclosure relate to a tethering connection using wireless communication, and more particularly, to an electronic device capable of providing a tethering service through wireless communication interfaces and a tethering connection method of an electronic device.

2. Description of the Related Art

The advent of communication technology has brought various types of wired and wireless Internet access services. With the increase in the number of high-performance portable terminals providing various functions, such as smart phones, people can use various Internet access services anywhere and anytime. A tethering service, among the various Internet access services, causes electronic devices that cannot access a communication network to access the communication network using, as a medium, an electronic device that is capable of accessing the communication network through 4G (LTE), 3G (Generation), or 2G, thereby using services such as the Internet.

Wireless communication networks capable of providing such a tethering service may be variously classified according to service provision schemes, which may include, for example, bluetooth low energy (BLE), bluetooth (BT), wireless fidelity (WiFi), and the like. Since the respective wireless communication networks have different characteristics, an appropriate wireless communication network can be used according to various situations when providing a tethering service. For example, a tethering service using bluetooth low energy (BLE) may provide a tethering connection with low power, but since the data transmission rate thereof is relatively low, compared to other wireless communication networks, it may be suitable for data communication such as text. A tethering service using WiFi may be suitable for data communication, such as raw-data backup, because it has a high data transmission rate compared to other wireless communication networks, despite relatively high power consumption. In the case of a tethering service using bluetooth (BT), a tethering connection may be provided using power consumption higher than that of bluetooth low energy (BLE) but lower than that of WiFi, and may have a transmission rate lower than that of WiFi but higher than that of bluetooth low energy (BLE), so that it may be suitable for data communication, such as photographs.

Recently, electronic devices providing a tethering service have been equipped with a plurality of wireless communication interfaces to enable access to all of the various wireless communication networks described above, and respective electronic devices to be provided with a tethering service while being connected to the electronic device providing the tethering service may use the tethering service through any one of the plurality of wireless communication interfaces.

SUMMARY

In the case where an electronic device selects one of a plurality of communication interfaces and provides a tethering service, the available communication range, the energy efficiency, and the transmission rate may vary depending on the selected communication interface. Therefore, when the electronic device supports a tethering service by selecting one of the plurality of communication interfaces, it is necessary to select an appropriate communication interface on the basis of various network environments of the electronic device and external electronic devices, state information of each electronic device, and changes in the state information.

Various embodiments of the disclosure can provide an electronic device capable of performing a tethering connection through an optimal communication interface selected from among a plurality of communication interfaces according to the usage environment and the purpose of tethering when providing a tethering service, and a method of providing a tethering connection using the electronic device.

According to various embodiments, an electronic device may include: a communication circuit including a plurality of communication interfaces; a processor electrically connected to the plurality of communication modules; and a memory electrically connected to the processor, wherein the memory stores instructions that cause, when executed, the processor to: receive, from an external electronic device, information related to the external electronic device; select a communication interface to be used for tethering from among the plurality of communication interfaces on the basis of at least some of the received information; and perform a tethering connection with the external electronic device through the selected communication interface.

According to various embodiments, a tethering connection method of an electronic device may include: receiving, from an external electronic device, information related to the external electronic device; selecting a communication interface to be used for tethering from among a plurality of communication interfaces included in a communication circuit of the electronic device on the basis of at least some of the received information; and performing a tethering connection through the selected communication interface.

According to various embodiments, an electronic device may include: a first communication circuit including a plurality of communication interfaces in communication with at least one external electronic device; a processor electrically connected to the first communication circuit and a second communication circuit; and a memory electrically connected to the processor, wherein the memory stores instructions that cause, when executed, the processor to: receive, from the at least one external electronic device, information related to the external electronic device through the second communication circuit in communication with an external network and the first communication circuit; determine a communication interface to be used for tethering a service provided from the external network to the at least one external electronic device, among the plurality of communication interfaces, on the basis of at least some of the received information; and transmit tethering capability of the determined communication interface to the at least one external electronic device.

According to various embodiments, it is possible to provide an efficient tethering function with appropriate power consumption and an appropriate transmission rate by performing a tethering connection through an optimal communication interface selected from among a plurality of communication interfaces according to the usage environment and purpose of the tethering.

In addition, the tethering function may be provided through an automatic connection with the optimal communication interface selected from among the plurality of communication interfaces without a user's selection according to a communication history pattern of an electronic device, which is generated by a user's use thereof for communication, thereby improving convenience for the user.

DETAILED DESCRIPTION

Figure 1:
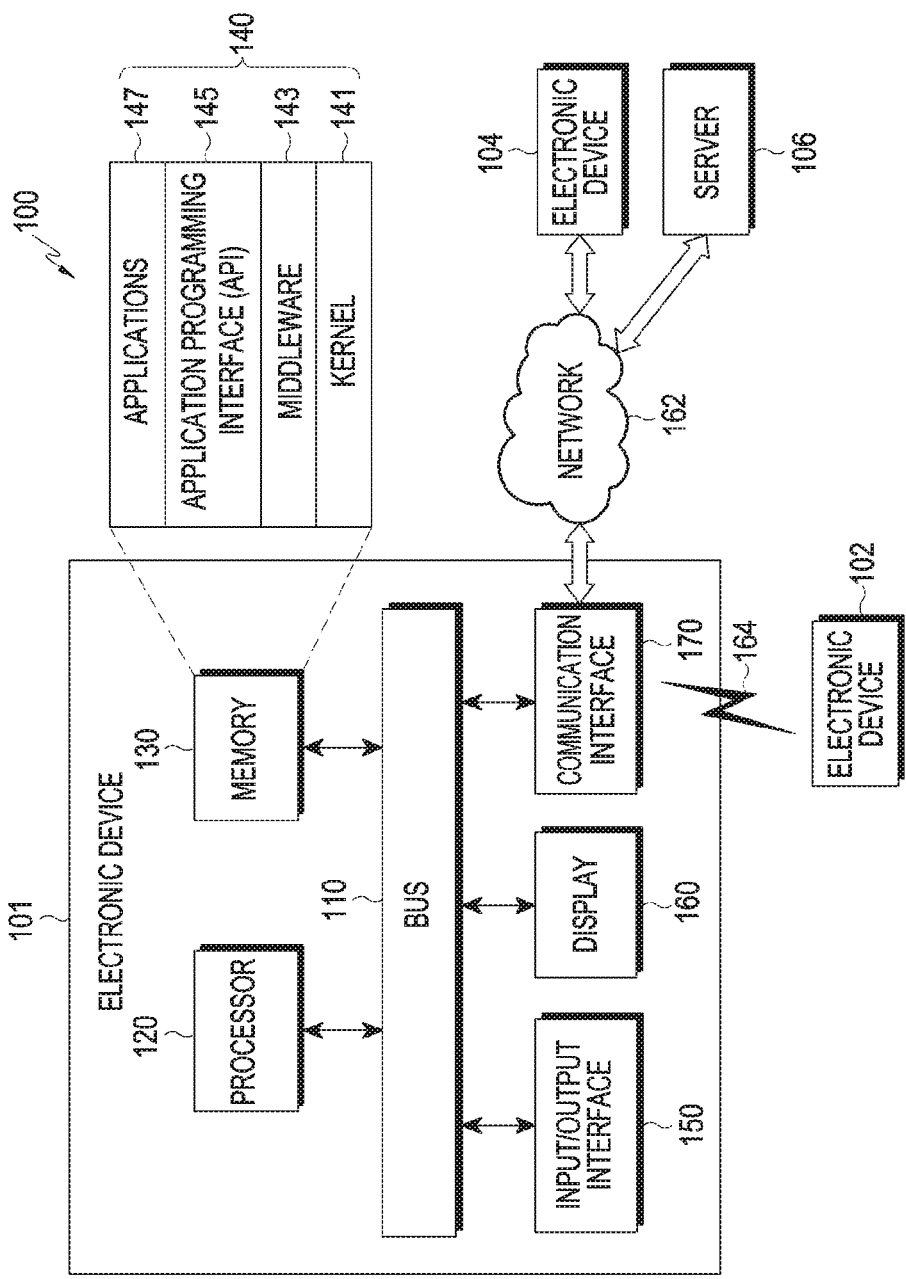
FIG. 1 illustrates an electronic device in a network environment according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an Automatic Teller Machine (ATM) in banks, a Point Of Sale (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of a piece of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

Referring to FIG. 1, an electronic device 101 in a network environment 100 in various embodiments is described. The electronic device 101 may include a bus 110, a processor 120, a memory 130, an input/output interface 150, a display 160, and a communication interface 170. In some embodiments, the electronic device 101 may exclude one or more elements, or may add other elements thereto. The bus 110 may include a circuit for connecting the elements 110 to 170 to each other and transmitting communications (e.g., control messages or data) between the elements. The processor 120 may include at least one of a central processing unit, an application processor, or a communication processor (CP). The processor 120, for example, may perform calculation or data processing in relation to the control and/or communication of one or more other elements of the electronic device 101.

The memory 130 may include a volatile and/or nonvolatile memory. For example, the memory 130 may store instructions or data in relation to one or more other elements of the electronic device 101. According to an embodiment, the memory 130 may store software and/or programs 140. For example, the programs 140 may include a kernel 141, middleware 143, an application programming interface (API) 145, and/or an application programs (or "applications") 147. At least some of the kernel 141, the middleware 143, or the API 145 may be referred to as an operating system (OS). The kernel 141, for example, may control or manage system resources (e.g., the bus 110, the processor 120, or the memory 130) used to execute the operation or function that is implemented in other programs (e.g., the middleware 143, the API 145, or the application programs 147). In addition, the kernel 141 may provide an interface that causes the middleware 143, the API 145, or the application programs 147 to access respective elements of the electronic device 101 for control or management of system resources.

The middleware 143, for example, may play an intermediate role between the API 145 or the application programs 147 and the kernel 141 to communicate with each other for the transmission and reception of data. In addition, the middleware 143 may process one or more operation requests received from the application programs 147 according to a priority thereof. For example, the middleware 143 may give priority for using the system resources (e.g., the bus 110, the processor 120, or the memory 130) of the electronic device 101 to at least one of the application programs 147, and may process the one or more operation requests. The API 145 may be an interface by which the application programs 147 control functions provided by the kernel 141 or the middleware 143, and, for example, may include one or more interfaces or functions (e.g., instructions) for file control, window control, image processing, or text control. The input/output interface 150, for example, may transfer commands or data received from a user or other external devices to other elements of the electronic device 101, or may output commands or data received from other elements of the electronic device 101 to the user or the other external devices.

The display 160, for example, may include a liquid crystal display (LCD), a light-emitting diode (LED) display, an organic light-emitting diode (OLED) display, a micro-electromechanical system (MEMS) display, or an electronic paper display. For example, the display 160 may display a variety of content (e.g., text, images, videos, icons, symbols, or the like) to the user. The display 160 may include a touch screen, and may receive a touch input, a gesture input, a proximity input, or a hovering input using electronic pens or a user's body part. The communication interface 170, for example, may configure communication between the electronic device 101 and external devices (e.g., a first external electronic device 102, a second external electronic device 104, or a server 106). For example, the communication interface 170 may be connected to the network 162 through wireless communication or wired communication to thus communicate with the external devices (e.g., the second external electronic device 104, or the server 106).

For example, the wireless communication may include cellular communication that uses at least one of LTE, LTE-A (LTE advance), code division multiple access (CDMA), wideband CDMA (WCDMA), universal mobile telecommunications system (UMTS), wireless broadband (WiBro), global system for mobile communications (GSM), or the like. According to an embodiment, the wireless communication may include at least one of, for example, wireless fidelity second selection criterion (WiFi), light fidelity (LiFi), bluetooth, bluetooth low energy (BLE), ZigBee, near field communication (NFC), magnetic secure transmission, radio frequency (RF), or a body area network (BAN), as the element 164 shown in FIG. 1. According to an embodiment, the wireless communication may include a GNSS. The GNSS, for example, may be a global positioning system (GPS), a global navigation satellite system (Glonass), a beidou navigation satellite system (hereinafter, "Beidou"), Galileo, or the European global satellite-based navigation system. Hereinafter, "GPS" may be used interchangeably with "GNSS" in the specification. For example, the wired communication may include at least one of a universal serial bus (USB), a high-definition multimedia interface (HDMI), recommended standard 232 (RS-232), power line communication, a plain old telephone service (POTS), or the like. The network 162 may include at least one of telecommunication networks, such as a computer network (e.g., LAN or WAN), the Internet, or a telephone network.

Each of the first external device 102 and the second external device 104 may be the same as, or different from, the electronic device 101 as to the type thereof. According to various embodiments, at least all or some of the operations executed in the electronic device 101 may be executed by one or more other electronic devices (e.g., the electronic device 102 or 104, or the server 106). According to an embodiment, in the case where the electronic device 101 executes a specific function or service automatically or upon request, the electronic device 101 may make a request to the other devices (e.g., the electronic devices 102 and 104 or the server 106) for at least some of the functions related to the function or service in addition to, or instead of, executing the same by itself. The other electronic devices (e.g., the electronic devices 102 and 104 or the server 106) may execute the requested function or additional function, and may transfer the result of execution thereof to the electronic device 101. The electronic device 101 may provide the requested function or service by providing the received result without change or by further processing the same. To this end, for example, cloud computing, distributed computing, or client-server computing technology may be used.

Figure 2:
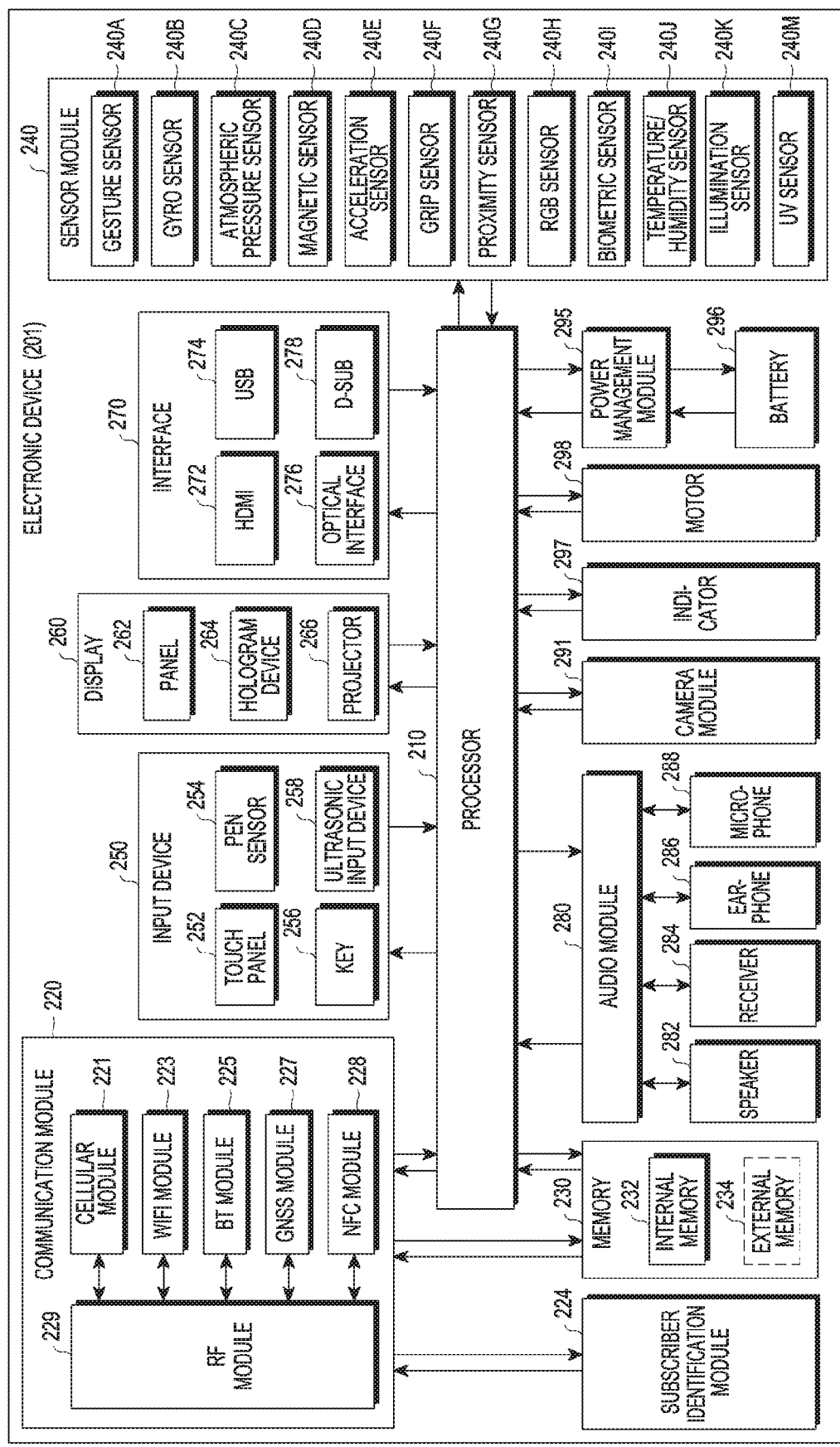
FIG. 2 is a block diagram of an electronic device according to various embodiments.

FIG. 2 is a block diagram of an electronic device 201 according to various embodiments. The electronic device 201, for example, may include all or some of the elements of the electronic device 101 shown in FIG. 1. The electronic device 201 may include one or more processors (e.g., the AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210, for example, may control a multitude of hardware or software elements connected to the processor 210, and may perform processing of various pieces of data and calculation by executing an operating system or application programs. The processor 210 may be implemented by, for example, a system on chip (SOC). According to an embodiment, the processor 210 may further include a graphic processing unit (GPU) and/or an image signal processor. The processor 210 may include at least some (e.g., a cellular module 221) of the elements shown in FIG. 2. The processor 210 may load commands or data received from at least one of other elements (e.g., a non-volatile memory) to a volatile memory, thereby processing the same, and may store the resultant data in a non-volatile memory.

The communication module 220 may have a configuration the same as or similar to that of the communication interface 170. The communication module 220, for example, may include a cellular module 221, a WiFi module 223, a Bluetooth module 225, a GNSS module 227, an NFC module 228, and an RF module 229. The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP). According to an embodiment, at least some (e.g., two or more) of the cellular module 221, the WiFi module 223, the Bluetooth module 225, the GNSS module 227, or the NFC module 228 may be included in a single integrated chip (IC) or a single IC package. The RF module 229 may transmit and receive communication signals (e.g., RF signals). The RF module 229 may include, for example, a transceiver, a power amp module (PAM) a frequency filter, a low noise amplifier (LNA), antennas, or the like. According to another embodiment, at least one of the cellular module 221, the WiFi module 223, the Bluetooth module 225, the GNSS module 227, or the NFC module 228 may transmit and receive RF signals through a separate RF module. The subscriber identification module 224, for example, may include a card having a subscriber identification module or an embedded SIM, and may contain inherent identification information (e.g., an integrated circuit card identifier (ICCID)) or subscriber information (e.g., an international mobile subscriber identity (IMSI)).

The memory 230 (e.g., the memory 130) may include an internal memory 232 or an external memory 234. The internal memory 232, for example, may include at least one of a volatile memory (for example, a dynamic random access memory (DRAM), a static RAM (SRAM), a synchronous dynamic RAM (SDRAM), or the like) or a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, a solid state drive (SSD), or the like). The external memory 234 may include a flash drive, and, for example, may include compact flash (CF), secure digital (SD), a micro secure digital (Micro-SD), a mini secure digital (Mini-SD), an eXtreme digital (xD), a multi-media card (MMC), a memory stick, or the like. The external memory 234 may be functionally or physically connected with the electronic device 201 through any of various interfaces.

The sensor module 240, for example, may measure physical quantities, or may detect the state of operation of the electronic device 201, thereby converting the measured or detected information into electric signals. The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illuminance sensor 240K, or an ultra-violet (UV) sensor 240M. Alternatively or additionally, the sensor module 240, for example, may further include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240, thereby controlling the sensor module 240 while the processor 210 is in a sleep mode.

The input device 250, for example, may include a touch panel 252, a (digital) pen sensor 254, keys 256, or an ultrasonic input device 258. The touch panel 252 may be implemented as at least one of, for example, a capacitive type, a pressure-sensitive type, an infrared type, or an ultrasonic type. In addition, the touch panel 252 may further include a control circuit. The touch panel 252 may further include a tactile layer, thereby providing a user with a tactile reaction. For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through a microphone (e.g., a microphone 288), thereby identifying data corresponding to the ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may be configured as one or more modules together with the touch panel 252. According to an embodiment, the panel 262 may include a pressure sensor (or a force sensor) capable of measuring the intensity of pressure with respect to a user's touch. The pressure sensor may be implemented to be integral with the touch panel 252, or may be implemented as one or more sensors separated from the touch panel 252. The hologram device 264 may display 3D images in the air using light interference. The projector 266 may display images by projecting light onto a screen. The screen may be positioned, for example, inside or outside the electronic device 201. The interface 270 may include, for example, at least one of an HDMI 272, a USB 274, an optical interface 276, or a D-sub (D-subminiature) 278. The interface 270 may be included in, for example, the communication interface 170 shown in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may convert a sound into an electric signal, and vice versa. At least some elements of the audio module 280 may be included, for example, in the input/output interface 150 shown in FIG. 1. For example, the audio module 280 may process voice information that is input or output through a speaker 282, a receiver 284, earphones 286, or a microphone 288. The camera module 291, for example, may be a device for taking still and moving images, and, according to an embodiment, the camera module 291 may include one or more image sensors (e.g., a front sensor or a rear sensor), lenses, an image signal processor (ISP), or a flash (e.g., an LED or a xenon lamp). The power management module 295, for example, may manage the power of the electronic device 201. According to an embodiment, the power management module 295 may include a power management integrated circuit (PMIC), a charger integrated circuit (IC), or a battery or fuel gauge. The PMIC may be implemented as a wired charging type and/or a wireless charging type. The wireless charging type may encompass, for example, a magnetic resonance type, a magnetic induction type, or an electromagnetic wave type, and may further include additional circuits for wireless charging, such as coil loops, resonance circuits, or rectifiers. The battery gauge may measure, for example, the remaining power of the battery 296, a charging voltage, current, or temperature. The battery 296 may include, for example, a rechargeable battery and/or a solar battery.

The indicator 297 may display the specific state of the electronic device 201 or a part (e.g., the processor 210) thereof, such as a booting state, a message state, or a charging state. The motor 298 may convert an electric signal to a mechanical vibration, and may provide a vibration or a haptic effect. The electronic device 201 may include a device (e.g., a GPU) for supporting mobile TV, which may process media data according to standards, such as, digital multimedia broadcasting (DMB), digital video broadcasting (DVB), MediaFlo™, or the like. The respective elements described in this specification may include one or more components, and the names of the corresponding elements may vary depending on the type of electronic device. In various embodiments, the electronic device (e.g., the electronic device 201) may exclude some elements, or may include additional elements, or some of the elements may be combined into a single entity that performs the same functions as those of the original elements.

Figure 3:
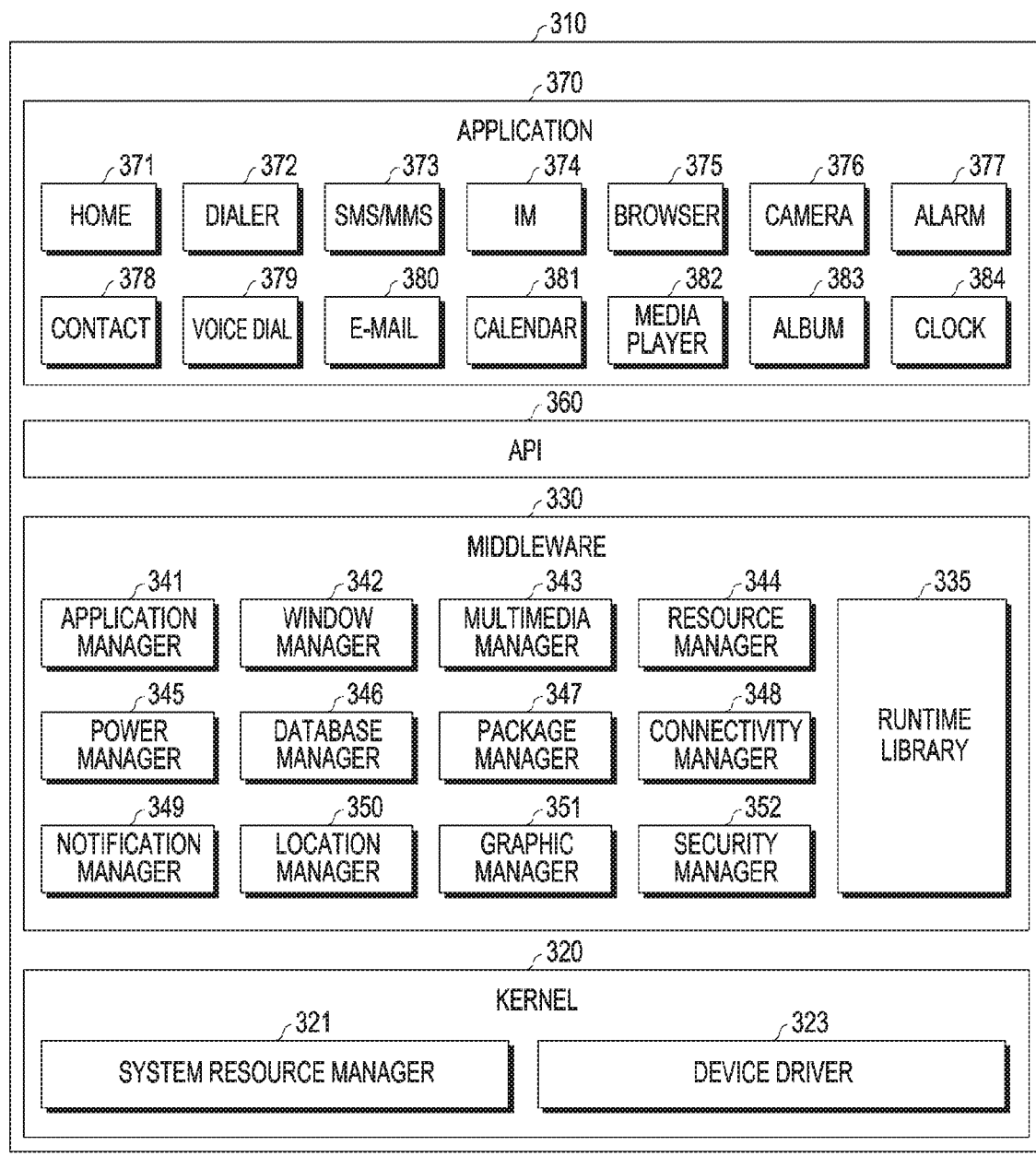
FIG. 3 is a block diagram of a program module according to various embodiments.

FIG. 3 is a block diagram of a program module, according to various embodiments. According to an embodiment, the program module 310 (e.g., the programs 140) may include an operating system for controlling resources related to the electronic device (e.g., the electronic device 101) and/or various applications (e.g., the application programs 147), which are operated under the operating system. For example, the operating system may be Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least some of the program module 310 may be preloaded in the electronic device, or may be downloaded from external electronic devices (e.g., the electronic devices 102 and 104 or the server 106).

The kernel 320, for example, may include a system resource manager 321 and/or a device driver 323. The system resource manager 321 may perform control, allocation, or collection of the system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330, for example, may provide functions required in common for the applications 370, or may provide various functions to the applications 370 through the API 360 in order to cause the applications 370 to use the limited system resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335, for example, may include a library module that a compiler uses in order to add new functions through programming languages while the applications 370 are executed. The runtime library 335 may perform input/output management, memory management, or an arithmetic calculation process. The application manager 341, for example, may manage the life cycle of the applications 370. The window manager 342 may manage a GUI resource used on the screen. The multimedia manager 343 may identify formats for reproducing media files, and may perform encoding or decoding of media files using a codec conforming to the corresponding format. The resource manager 344 may manage source code or memory space for the applications 370. The power manager 345, for example, may manage the capacity, temperature, or power of the battery, and may determine or provide power information necessary for the operation of the electronic device using corresponding information, among the same. According to an embodiment, the power manager 345 may operate in association with a basic input/output system (BIOS). The database manager 346 may generate, retrieve, or change a database that is to be used in, for example, one or more applications 370. The package manager 347 may manage the installation or update of applications that are distributed in the form of a package file.

The connectivity manager 348, for example, may manage a wireless connection. The notification manager 349 may provide events, such as received messages, appointments, or proximity notifications, to the user. The location manager 350, for example, may manage location information of the electronic device. The graphic manager 351, for example, may manage graphic effects to be provided to the user or a user interface related thereto. The security manager 352 may provide, for example, system security or user authentication. According to an embodiment, the middleware 330 may further include a telephony manager for managing the functions of a voice call or a video call of the electronic device or a middleware module capable of producing a combination of the functions of the above-described elements. According to an embodiment, the middleware 330 may provide a module that is specialized according to the type of operating system. The middleware 330 may dynamically exclude some typical elements or add new elements. The API 360, for example, may be a group of API programming functions, and may be provided as a different configuration according to an operating system. For example, one set of APIs may be provided to each platform in the case of Android or iOS, and two or more sets of APIs may be provided to each platform in the case of Tizen.

The applications 370, for example, may include an application of home 371, a dialer 372, SMS/MMS 373, instant message (IM) 374, a browser 375, a camera 376, an alarm 377, contacts 378, a voice dialer 379, e-mail 380, a calendar 381, a media player 382, an album 383, a watch 384, healthcare (e.g., measuring the amount of exercise or blood glucose), or providing environment information (e.g., providing atmospheric pressure, humidity, or temperature information), or the like. According to an embodiment, the applications 370 may include an information-exchange application that supports the exchange of information between the electronic device and external electronic devices. The information-exchange application, for example, may include a notification relay application for relaying specific information to the external electronic devices, or may include a device management application for managing the external electronic devices. For example, the notification relay application may transfer notification information generated in other applications of the electronic device to the external electronic device, or may receive notification information from the external electronic device to thus provide the same to the user. The device management application, for example, may install, delete, or update functions (e.g., turning on and off the external electronic device (or some elements) or adjusting the brightness (or resolution) of a display) of the external electronic device that communicates with the electronic device or applications executed in the external electronic device. According to an embodiment, the applications 370 may include applications that are designated according to the attributes of the external electronic device (e.g., a healthcare application of a mobile medical device). According to an embodiment, the applications 370 may include applications that are received from the external electronic device. At least some of the program module 310 may be implemented (e.g., executed) by software, firmware, hardware (e.g., the processor 120), or a combination thereof, and may include modules, program routines, sets of instructions, or processors for executing one or more functions.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., compact disc read only memory (CD-ROM) and a digital versatile disc (DVD)), a magneto-optical media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
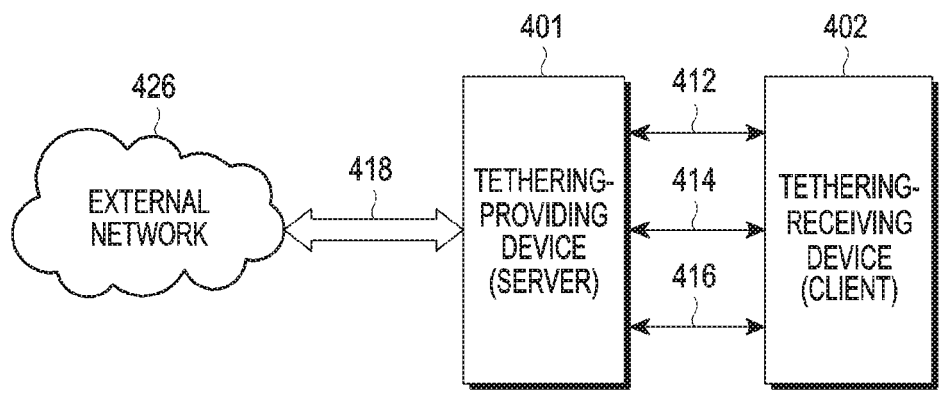
FIG. 4 schematically illustrates a tethering network environment according to various embodiments.

FIG. 4 schematically illustrates a tethering system according to various embodiments.

Referring to FIG. 4, a tethering system according to various embodiments may include a tethering-providing device 401, a tethering-receiving device 402, and an external network 426.

The tethering-providing device 401, which may serve as a server, provides a tethering service to the tethering-receiving device 402. For example, the tethering-providing device 401 may be connected to the external network 426, and may provide a tethering service to the tethering-receiving device 402, which is connected to the tethering-providing device 401 such that the tethering-receiving device 402 can use services via the external network 426. For example, the external network 426 may include a public network such as the Internet.

The tethering-providing device 401 includes a first communication circuit (not shown) for performing a communication connection 418 with the external network 426 and a second communication circuit (not shown) for performing a tethering connection 412, 414, or 416 with the tethering-receiving device 402 connected to the tethering-providing device 401. The second communication circuit (not shown) may include one or more communication interfaces (not shown), and the tethering-providing device 401 may perform the tethering connection 412, 414, or 416 through the one or more communication interfaces (not shown). For example, the one or more communication interfaces (not shown) may include at least one of bluetooth low energy (BLE), bluetooth (BT) (e.g., the BT module 225 shown in FIG. 2), or wireless fidelity (WiFi) (e.g., the WiFi module 223 shown in FIG. 2). The bluetooth low energy (BLE) may be configured as a separate circuit from that for the bluetooth (BT) and the BT module 225 shown in FIG. 2 may support both the bluetooth low energy (BLE) and the bluetooth (BT). In addition, the bluetooth (BT) may be, for example, classic BT. For example, the tethering-providing device 401 may perform a tethering connection 412 with the tethering-receiving device 402 through the bluetooth low energy (BLE), may perform a tethering connection 414 through the bluetooth (BT), or may perform a tethering connection 416 through the WiFi. In addition, the bluetooth low energy (BLE) of the one or more communication interfaces may perform, as well as the tethering connection, a communication connection with at least one external electronic device (e.g., the tethering-receiving device 402) (hereinafter, referred to as a "bluetooth low energy (BLE) communication connection").

For example, when a tethering service function is activated, the tethering-providing device 401 may periodically or aperiodically advertise a signal informing surrounding devices of the activation of the tethering service function. For example, the signal may be a beacon signal, and the beacon signal may include an indication indicating that the tethering-providing device 401 has a function of providing a tethering service and identification information for identifying the tethering-providing device 401. The tethering-providing device 401 may advertise the signal through, for example, a communication connection using the bluetooth low energy (BLE) (e.g., the bluetooth low energy (BLE) communication connection).

The tethering-receiving device 402 is a device serving as, for example, a client, which receives a tethering service from the tethering-providing device 401. For example, the tethering-receiving device 402 may be connected to the tethering-providing device 401, and may be provided with a tethering service from the tethering-providing device 401 so as to use services via the external network 426 connected to the tethering-providing device 401.

The tethering-receiving device 402 may include a communication circuit (not shown) capable of performing the tethering connection 412, 414, or 416 with the tethering-providing device 401. The communication circuit (not shown) may include one or more communication interfaces (not shown), and the tethering-receiving device 402 may perform the tethering connection 412, 414, or 416 through the one or more communication interfaces (not shown). For example, the one or more communication interfaces (not shown) may include at least one of bluetooth low energy (BLE), bluetooth (BT) (e.g., the BT module 225 shown in FIG. 2), or wireless fidelity (WiFi) (e.g., the WiFi module 223 shown in FIG. 2). The bluetooth low energy (BLE) may be configured as a separate circuit from that for the bluetooth (BT) and the BT module 225 shown in FIG. 2 may support both the bluetooth low energy (BLE) and the bluetooth (BT). In addition, the bluetooth (BT) may be, for example, classic BT. For example, the tethering-receiving device 402 may perform a tethering connection 412 with the tethering-providing device 401 through the bluetooth low energy (BLE), may perform a tethering connection 414 through the bluetooth (BT), or may perform a tethering connection 416 through the WiFi. In addition, the bluetooth low energy (BLE) of the one or more communication interfaces may perform, as well as the tethering connection, a BLE communication connection with at least one external electronic device (e.g., the tethering-providing device 401).

For example, when a tethering service function is activated, the tethering-receiving device 402 may scan a signal advertised from the tethering-providing device 401. When the signal is scanned, the tethering-receiving device 402 may transmit a signal in response to the signal to the tethering-providing device 401. The tethering-receiving device 402, for example, may scan the signal or may transmit a signal in response to the signal to the tethering-providing device 401 through a communication connection using the bluetooth low energy (BLE) (e.g., the BLE communication connection).

When the tethering-providing device 401 and the tethering-receiving device 402 recognize each other through the advertising and scanning, the tethering-providing device 401 and the tethering-receiving device 402 may perform a BLE communication connection through bluetooth low energy (BLE). The tethering-providing device 401 and the tethering-receiving device 402 may exchange information related to the states thereof (e.g., the operation state, the battery state, or the like) or information related to the network state (e.g., the connection state, the amount of data usage, or the like) with each other through the BLE communication connection. For example, the tethering-providing device 401 may transmit information related to the tethering-providing device 401 to the tethering-receiving device 402 through the BLE communication connection using bluetooth low energy (BLE), and the tethering-receiving device 402 may transmit information related to the tethering-receiving device 402 to the tethering-providing device 401 through the BLE communication connection using bluetooth low energy (BLE).

According to an embodiment, the information related to the tethering-providing device 401 may include at least some of information related to the state of the tethering-providing device 401, tethering capability information of the tethering-providing device 401, information related to the external network 426 connected to the tethering-providing device 401, or combinations thereof.

For example, the information related to the state of the tethering-providing device 401 may include battery information (e.g., the amount of charge, the remaining amount of power, etc.) of the tethering-providing device 401. The tethering capability information of the tethering-providing device 401 may include the type of at least one communication interface to be used for the tethering connection supported by the tethering-providing device 401, the transmission rate of each communication interface, the power consumption thereof, information on whether or not an automatic tethering connection (e.g., an auto-connection function) is provided, a communication range, and the like. The information related to the external network 426 connected to the tethering-providing device 401 may include the type of external network, the transmission rate thereof (e.g., 2G, 3G, LTE, or the like), and the like.

According to an embodiment, the information related to the tethering-receiving device 402 may include at least some of information related to the state of the tethering-receiving device 402, tethering capability information of the tethering-receiving device 402, a designated tethering usage time, a designated tethering usage location, information on a tethering-related application that is being executed in the tethering-receiving device 402, a tethering usage pattern based on a tethering usage history of the tethering-receiving device 402, or combinations thereof.

For example, the information related to the state of the tethering-receiving device 402 may include battery information (e.g., the amount of charge, the remaining amount of power, etc.) of the tethering-receiving device 402. The tethering capability information of the tethering-receiving device 402 may include the type of at least one communication interface to be used for the tethering connection supported by the tethering-receiving device 402, the transmission rate of each communication interface, the power consumption thereof, information on whether or not an automatic tethering connection (e.g., an auto-connection function) is provided, a communication range, and the like. The designated tethering usage time and the designated tethering usage location may be designated by the user, or may be predetermined. The information on the running application in relation to the tethering may be information related to an application when the application (e.g., the Internet, a dialogue application, etc.), to which a tethering service is applicable, is executed after the tethering service is started. The tethering usage pattern, for example, may be obtained by analyzing the type of application (e.g., a voice call, file transport protocol (FTP), an instant message, broadcasting, navigation, or the like) used in the tethering-receiving device 402 through the tethering connection for a predetermined unit time, the usage time, duration, usage location, and usage period of a tethering service for each application, and a tethering usage history of the accumulated amount (size) of tethering data transmission/reception.

According to an embodiment, the tethering-providing device 401 may select one of a plurality of communication interfaces supported by the tethering-providing device 401 on the basis of at least some of information related to the tethering-providing device 401, the received information related to the tethering-receiving device 402, or a combination thereof, and may perform the tethering connection 412, 414, or 416 with the tethering-receiving device 402 through the selected communication interface.

According to an embodiment, the tethering-receiving device 402 may select one of a plurality of communication interfaces supported by the tethering-receiving device 402 on the basis of at least some of information related to the tethering-receiving device 402, the received information related to the tethering-providing device 401, or a combination thereof, and may perform the tethering connection 412, 414, or 416 with the tethering-providing device 401 through the selected communication interface.

Figure 5:
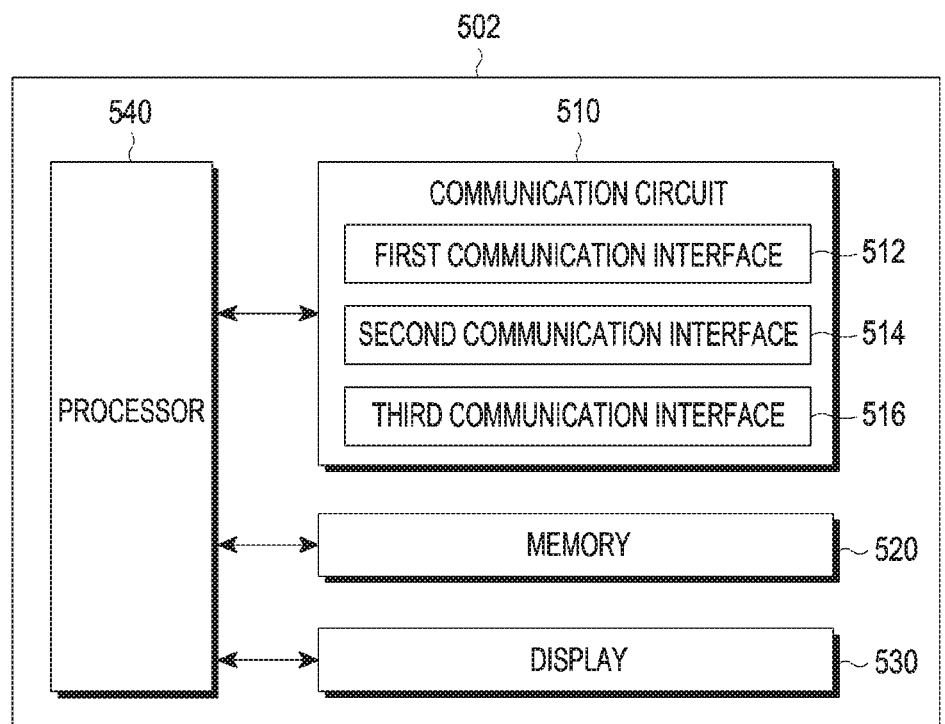
FIG. 5 is a block diagram of an electronic device according to various embodiments.

FIG. 5 is a block diagram of an electronic device according to various embodiments.

Referring to FIG. 5, an electronic device 502 according to various embodiments may include a communication circuit 510, a memory 520, a display 530, and at least one processor 540. The electronic device 502 may be a tethering-receiving device, and may include all or some of the configurations of the tethering-receiving device 402 shown in FIG. 4. Alternatively, the electronic device 502 may include all or some of the configurations of the electronic device 101 shown in FIG. 1 or the electronic device 201 shown in FIG. 2.

The communication circuit 510 may include communication interfaces capable of providing data based on short-range communication. For example, the communication interfaces capable of providing data based on short-range communication may include at least one of WiFi, Bluetooth, NFC, ZigBee, Z-Wave, GNSS, or the like. The communication circuit 510, for example, may include all or some of the configurations of the communication interface 170 shown in FIG. 1 or the communication module 220 shown in FIG. 2.

According to an embodiment, the communication circuit 510 may include a first communication interface 512, a second communication interface 514, and a third communication interface 516. The first communication interface 512 may be BLE, the second communication interface 514 may be BT (e.g., classic BT) (e.g., the BT module 225 shown in FIG. 2), and the third communication interface 516 may be WiFi (e.g., the WiFi module 223 shown in FIG. 2). The BLE may be configured as a separate circuit from that for BT and the BT module 225 shown in FIG. 2 may support both the BLE and the BT.

The communication circuit 510 may perform a tethering connection with an external electronic device (e.g., the tethering-providing device 401 in FIG. 4) in order to receive a tethering service from the external electronic device 401 through the at least one communication interface 512, 514, or 516.

According to an embodiment, the first communication interface 512 may perform a tethering connection with the external electronic device 401 by a bluetooth low energy (BLE)-tethering connection scheme (e.g., an Internet protocol support profile (IPSP) or an http proxy service (HPS)) under the control of the processor 540. The second communication interface 514 may perform a tethering connection with the external electronic device 401 by a BT (e.g., classic BT)-tethering connection scheme under the control of the processor 540. The third communication interface 516 may perform a tethering connection with the external electronic device 401 by a WiFi-tethering connection scheme under the control of the processor 540. In addition, the first communication interface 512 may perform a BLE communication connection with the external electronic device 401.

The memory 520 may store commands or data related to one or more other elements of the electronic device 502. The memory 520 may include all or some of the configurations of the memory 130 shown in FIG. 1 or the memory 230 shown in FIG. 2. The memory 520 may store information related to the electronic device 502 or information related to the external electronic device 401, which is received from the external electronic device 401.

According to an embodiment, the information related to the electronic device 502 may include at least some of information related to the state of the electronic device 502, tethering capability information of the electronic device 502, a designated tethering usage time, a designated tethering usage location, information on tethering-related applications supported by or installed in the electronic device 502, a tethering usage pattern based on a tethering usage history of the electronic device 502, or combinations thereof. For example, the information related to the state of the electronic device 502 may include battery information (e.g., the amount of charge, the remaining amount of power, etc.) of the electronic device 502. The tethering capability information of the electronic device 502 may include the type of at least one communication interface used for the tethering connection supported by the electronic device 502, the transmission rate of each communication interface, the power consumption thereof, information on whether or not an automatic tethering connection (e.g., an auto-connection function) is provided, a communication range, and the like. Table 1 below shows an example of the tethering capability information of the electronic device 502.

TABLE 1

| Type of communication interface | First communication interface (e.g., BLE) | Second communication interface (e.g., BT/classic BT) | Third communication interface (e.g., WiFi) |
| --- | --- | --- | --- |
| Transmission rate | About 10 Kbps (corresponding to 2G) | About 150 Kbps (corresponding to 3G) | About 10 to 30 Mbps (high level of LTE) |
| Power consumption | Standby/connection current: less than 1 mA | Standby current: less than 1 mA Connection current: 20 to 30 mA | Standby current: 100 mA Connection current: 100 mA to 300 mA |

TABLE 1-continued

| Type of communication interface | First communication interface (e.g., BLE) | Second communication interface (e.g., BT/classic BT) | Third communication interface (e.g., WiFi) |
|---|---|---|---|
| Auto connection | Supported | Not supported | Supported |
| Communication range | 100 m | 100 m | 140 m to 250 m |
| Examples of tethering use | Indoor sensors, simple notifications, execution of text or chat application based on text, long-term use without charging, etc. | Execution of text or chat application based on text/photos at transmission rate corresponding to 3G | Execution of application (e.g., moving picture/video reproduction) requiring transmission rate corresponding to LTE within short time, raw-data backup, etc. |

In addition, the designated tethering usage time and the designated tethering usage location may, be designated by the user, or may be predetermined. The information on the running application in relation to the tethering may be information related to an application when the application (e.g., the Internet, a dialogue application, etc.), to which a tethering service is applicable, is executed after the tethering service is started. The tethering usage pattern, for example, may be obtained by analyzing the type of application (e.g., a voice call, File Transport Protocol (FTP), an instant message, broadcasting, navigation, or the like) used in the electronic device 502 through the tethering connection for a predetermined unit time, the usage time, duration, usage location, and usage period of a tethering service for each application, and a tethering usage history of the accumulated amount (size) of tethering data transmission/reception.

The display 530 may be arranged between a first surface of the electronic device 502 (e.g., a front surface of the electronic device 502), which is directed in a first direction, and a second surface thereof (e.g., a back surface of the electronic device 502), which is directed in a second direction opposite the first direction, and the upper surface of the display 530 may be exposed through the first surface. In addition, the display 530 may be formed to be large enough to occupy the majority of the first surface of the electronic device 502. The display 530 may include, for example, all or some of the configurations of the display 160 shown in FIG. 1 or the display 260 shown in FIG. 2.

According to an embodiment, the display 530 may include a panel, such as an LCD, an AMOLED, or the like, and may display various images according to various operation states of the electronic device 502, application execution, and/or services.

For example, the display 530 may display information related to a tethering connection performed through the communication circuit 510. The information related to the tethering connection may indicate at least one of information on whether or not a tethering connection is performed, the type of the current tethering connection, the tethering connection state, or combinations thereof. The information related to the tethering connection is not limited thereto, and may include a variety of information related to the tethering connection. In addition, the display 530 may display a user interface (UI) that causes the user to select, configure, or specify the type of tethering connection when the tethering connection is performed manually. The user interface (UI) showing the information related to the tethering connection displayed on the display 530 will be described in more detail below with reference to FIGS. 10A and 10B.

The processor 540 may control the overall operation of the electronic device 502. The processor 540 may include, for example, all or some of the configurations of the processor 120 shown in FIG. 1 or the processor 210 shown in FIG. 2.

The processor 540 may receive information related to the external electronic device 401 from the external electronic device 401 via the communication circuit 510.

For example, when a tethering service function is activated, the processor 540 may scan a signal advertised from the external electronic device 401 through a communication connection (e.g., the BLE communication connection) using the first communication interface 512. The signal may be a beacon signal, and the beacon signal may include an indication indicating that the external electronic device 401 has a function of providing a tethering service and identification information for identifying the external electronic device 401.

When the signal is scanned, the processor 540 may transmit a communication connection request signal for requesting a communication connection to the external electronic device 401 through the first communication interface 512. The communication connection request signal may include a communication connection request message for requesting a communication connection using a communication scheme corresponding to the external electronic device 401 and the first communication interface 512.

The processor 540 may receive a communication connection response signal from the external electronic device 401 in response to the communication connection request signal. The communication connection response signal may include a communication connection acceptance message for accepting a communication connection using a communication scheme corresponding to the first communication interface 512. When the communication connection acceptance message is received, the processor 540 may perform a communication connection with the external electronic device 401 using a communication scheme corresponding to the first communication interface 512.

According to an embodiment, the electronic device may perform a low-power communication connection (e.g., the BLE communication connection) with the external electronic device using a bluetooth low energy (BLE) communication connection scheme through the first communication interface 512.

The processor 540 may exchange information with the external electronic device 401 through the performed communication connection. For example, the processor 540 may receive information related to the external electronic device 401 from the external electronic device 401 through the BLE communication connection performed by means of the first communication interface 512. In addition, the processor 540 may transmit information related to the electronic device 502 to the external electronic device 401 through the BLE communication connection performed by means of the first communication interface 512.

According to an embodiment, the processor 540 may select a communication interface to be used for tethering from among the plurality of communication interfaces 512, 514, and 516 on the basis of at least some of the information related to the external electronic device 401, which is received from the external electronic device 401.

For example, the processor 540 may determine the most optimal communication interface, among the plurality of communication interfaces 512, 514, and 516, on the basis of at least some of information related to the state of the external electronic device 401, tethering capability information of the external electronic device 401, information related to an external network (e.g., the external network 426) connected to the external electronic device 401, or combinations thereof, thereby selecting the corresponding communication interface as a communication interface to be used for tethering.

According to an embodiment, when a first selection criterion for selecting a communication interface to be used for tethering is satisfied on the basis of at least some of the received information related to the external electronic device 401, the processor 540 may select the first communication interface 512 from among the plurality of communication interfaces 512, 514, and 516. When a second selection criterion for selecting a communication interface to be used for tethering is satisfied on the basis of at least some of the received information related to the external electronic device 401, the processor 540 may select the second communication interface 514 from among the plurality of communication interfaces 512, 514, and 516. When a third selection criterion for selecting a communication interface to be used for tethering is satisfied on the basis of at least some of the received information related to the external electronic device 401, the processor 540 may select the third communication interface 516 from among the plurality of communication interfaces 512, 514, and 516.

According to an embodiment, the first selection criterion may include at least one of the case where the battery level of the external electronic device 401 is less than a first level (e.g., about 10 to 20% of the total battery capacity), the case where the transmission rate of the external network 426 is less than a first transmission rate (e.g., the degree corresponding to 2G), the case where the tethering capability of the external electronic device 401 (e.g., a tethering transmission rate of about 10 Kbps) corresponds to the tethering capability through the first communication interface 512, or combinations thereof. The second selection criterion may include at least one of the case where the battery level of the external electronic device 401 is equal to or more than the first level and less than a second level (e.g., about 70 to 80% of the total battery capacity), which is greater than the first level, the case where the transmission rate of the external network 426 is equal to or more than the first transmission rate and less than a second transmission rate (e.g., the degree corresponding to 3G), which is higher than the first transmission rate, the case where the tethering capability of the external electronic device 401 (e.g., a tethering transmission rate of about 150 Kbps) corresponds to the tethering capability through the second communication interface 514, or combinations thereof. The third selection criterion may include at least one of the case where the battery level of the external electronic device 401 is equal to or more than the second level, the case where the transmission rate of the external network 426 is equal to or more than the second transmission rate (e.g., the degree corresponding to LTE), the case where the tethering capability of the external electronic device 401 (e.g., a tethering transmission rate of about 10 to 30 Mbps) corresponds to the tethering capability through the third communication interface 516, or combinations thereof.

According to an embodiment, the processor 540 may determine the most optimal communication interface from among the plurality of communication interfaces 512, 514, and 516 on the basis of at least some of the received information related to the external electronic device 401, information related to the electronic device 502, or a combination thereof, thereby selecting the same as the communication interface to be used for tethering.

According to an embodiment, when a first selection criterion for selecting the communication interface to be used for tethering is satisfied on the basis of at least some of the received information related to the external electronic device 401, information related to the electronic device 502, or a combination thereof, the processor 540 may select the first communication interface 512 from among the plurality of communication interfaces 512, 514, and 516. When a second selection criterion for selecting the communication interface to be used for tethering is satisfied on the basis of at least some of the received information related to the external electronic device 401, information related to the electronic device 502, or a combination thereof, the processor 540 may select the second communication interface 514 from among the plurality of communication interfaces 512, 514, and 516. When a third selection criterion for selecting the communication interface to be used for tethering is satisfied on the basis of at least some of the received information related to the external electronic device 401, information related to the electronic device 502, or a combination thereof, the processor 540 may select the third communication interface 516 from among the plurality of communication interfaces 512, 514, and 516.

According to an embodiment, the first selection criterion may include at least one of the case where the battery level of the external electronic device 401 or the electronic device 502 is less than a first level (e.g., about 10 to 20% of the total battery capacity), the case where the transmission rate of the external network 426 is less than a first transmission rate (e.g., the degree corresponding to 2G), the case where at least one of the tethering capability of the external electronic device 401 (e.g., a tethering transmission rate of about 10 Kbps), the designated tethering usage time, the designated tethering usage location, a running application in relation to the tethering, a tethering usage pattern based on the tethering usage history of the electronic device 502, information on the distance between the electronic device 502 and the external electronic device 401, or the signal intensity of the electronic device 502 (e.g., a received signal strength indication (RSSI)) corresponds to the tethering capability through the first communication interface 512, or combinations thereof.

The second selection criterion may include at least one of the case where the battery level of the external electronic device 401 or the electronic device 502 is equal to or more than the first level and less than a second level (e.g., about 70 to 80% of the total battery capacity), which is greater than the first level, the case where the transmission rate of the external network 426 is equal to or more than the first transmission rate and less than a second transmission rate (e.g., the degree corresponding to 3G), which is greater than the first transmission rate, the case where at least one of the tethering capability of the external electronic device 401 (e.g., a tethering transmission rate of about 150 Kbps), the designated tethering usage time, the designated tethering usage location, a running application in relation to the tethering, a tethering usage pattern based on the tethering usage history of the electronic device 502, information on the distance between the electronic device 502 and the external electronic device 401, or the signal intensity of the electronic device 502 (e.g., the RSSI) corresponds to the tethering capability through the second communication interface 514, or combinations thereof.

The third selection criterion may include at least one of the case where the battery level of the external electronic device 401 or the electronic device 502 is equal to or more than the second level, the case where the transmission rate of the external network 426 is equal to or more than the second transmission rate (e.g., the degree corresponding to LTE), the case where at least one of the tethering capability of the external electronic device 401 (e.g., a tethering transmission rate of about 10 to 30 Mbps), the designated tethering usage time, the designated tethering usage location, the miming application in relation to the tethering, the tethering usage pattern based on the tethering usage history of the electronic device, information on the distance between the electronic device 502 and the external electronic device 401, or the signal intensity of the electronic device 502 (e.g., the RSSI) corresponds to the tethering capability through the third communication interface 516, or combinations thereof.

In addition, each of the first, second, and third selection criteria may be automatically selected by the electronic device 502 or the external electronic device 401, or may have different weights from each other depending on preferences set by the user.

The processor 540 may perform a tethering connection with the external electronic device 401 through the selected communication interface.

For example, when the selected communication interface is the first communication interface 512 (e.g., BLE), the processor 540 may perform a tethering connection with the external electronic device 401 by a BLE-tethering connection scheme (e.g., IPSP or an HPS). When the selected communication interface is the second communication interface 514 (e.g., BT (e.g., classic BT), the processor 540 may perform a tethering connection with the external electronic device 401 by a BT (e.g., classic BT)-tethering connection scheme. When the selected communication interface is the third communication interface 301 (e.g., WiFi), the processor 540 may perform a tethering connection with the external electronic device 401 by a WiFi-tethering connection scheme.

According to an embodiment, the processor 540 may provide both a communication connection (e.g., the BLE communication connection) and a tethering connection (e.g., a BLE tethering connection) through the first communication interface 512.

According to an embodiment, when a tethering connection is completed through the communication interface selected from among the plurality of communication interfaces 512, 514, and 516, the processor 540 may interrupt (disconnect) the BLE communication connection using the first communication interface 512. For example, when a tethering connection is completed through a communication interface selected from among the plurality of communication interfaces 512, 514, and 516, the processor 540 may interrupt (disconnect) the BLE communication connection through the first communication interface 512 in order to prevent a collision between the tethering connection (e.g., the BLE-tethering connection, the BT/classic BT-tethering connection, or the WiFi-tethering connection) and the BLE communication connection through the first communication interface 512 or power consumption thereof.

According to an embodiment, the processor 540 may determine whether or not the type of tethering connection is required to be switched while performing a tethering service through the selected communication interface.

For example, the processor 540 may monitor whether or not at least some of the information related to the electronic device 502 or the information related to the external electronic device 401 is changed during the tethering through the tethering connection, thereby determining whether or not the type of tethering connection is required to be switched. For example, the processor 540 may determine whether or not a switching criterion for switching the type of tethering connection is satisfied on the basis of the changed information during the tethering through the tethering connection. When the switching criterion is satisfied, the processor 540 may determine that the type of tethering connection is required.

According to an embodiment, the switching criterion may include at least one of a change in at least some of information included in selection criteria for communication interfaces to be used for tethering (e.g., the first to third selection criteria), a change in the designated tethering usage time, a change in the designated tethering usage location, a change in the information on the tethering-related application being executed in the electronic device, a change in the tethering usage pattern based on the tethering usage history of the electronic device, information on a designated distance between the electronic device 502 and the external electronic device 401, a designated signal intensity (e.g., the RSSI) of the electronic device 502, or combinations thereof.

For example, the processor 540 may periodically or aperiodically monitor whether or not at least some of the information included in the selection criterion of the communication interface to be used for tethering is changed. For example, the processor 540 may periodically or aperiodically monitor the state of the battery of the electronic device 502. When the state of the battery is out of a range set to correspond to the selected communication interface, the processor 540 may determine that the type of tethering connection is required to be switched. For example, when the battery level of the electronic device 502 is equal to or more than the first level while the processor 540 is tethering through a tethering connection using the first communication interface 512, the processor 540 may determine that the type of tethering connection is required to be switched. When the battery level of the electronic device 502 is less than the first level or equal to or more than the third level while the processor 540 is tethering through a tethering connection using the second communication interface 514, the processor 540 may determine that the type of tethering connection is required to be switched. When the battery level of the electronic device 502 is less than the third level while the processor 540 is tethering through a tethering connection using the third communication interface 516, the processor 540 may determine that the type of tethering connection is required to be switched.

According to an embodiment, the processor 540 may receive, from the external electronic device 401, changed information, among the information related to the external electronic device 401. For example, the external electronic device 401 may transmit changed information to the electronic device 502 when the information related to the external electronic device 401 is changed. When the changed information is received from the external electronic device 401, the processor 540 may determine that at least some of the information related to the external electronic device 401 has changed, and thus may determine that the type of tethering connection is required to be switched.

When it is determined that the type of tethering connection is required to be switched, the processor 540 may select a communication interface to be switched to, among the plurality of communication interfaces 512, 514, and 516, on the basis of the changed information, among the information related to the external electronic device 401. In addition, the processor 540 may select the communication interface corresponding to the changed information, among the information related to the external electronic device 401 or the information related to the electronic device 502, as a communication interface to be switched to. When the communication interface to be switched to is selected, the processor 540 may transmit, to the external electronic device 401, a tethering-connection-type-switching request signal for switching the communication connection with the external electronic device 401 by means of the communication interface to be switched to. The processor 540 may switch the type of tethering connection using the communication interface reselected from among the plurality of interfaces 512, 514, and 516.

In the case where the processor 540 performs the tethering connection and then interrupts (disconnects) the BLE communication connection through the first communication interface 512, when it is determined that the type of tethering connection is required to be switched, the processor 540 may re-perform the interrupted (disconnected) BLE communication connection through the first communication interface 512. The processor 540 may transmit, to the external electronic device 401, a tethering-connection-type-switching request signal for switching the tethering connection with the external electronic device 401 by means of the communication interface to be switched to, through the BLE communication connection using the re-performed first communication interface 512. The processor 540 may receive a response signal from the external electronic device 401 in response to the tethering-connection-type-switching request signal. In response to the reception of the response signal, the processor 540 may switch the type of tethering connection through the communication interface reselected from among the plurality of communication interfaces 512, 514, and 516.

Meanwhile, when the switching criterion is not satisfied, the processor 540 may determine that the type of tethering connection is not required to be switched, and may maintain the tethering connection through the selected communication interface.

The processor 540 may provide an automatic tethering connection function (e.g., an auto-connection function) during the tethering through a tethering connection (e.g., the BLE-tethering connection or the WiFi-tethering connection) using the first communication interface 512 or the third communication interface 516. For example, when the electronic device 502 moves out of the communication range corresponding to the communication interface (e.g., the first communication interface 512 or the third communication interface 516) and then re-enters the communication range, the processor 540 may perform an automatic tethering connection such that the tethering is performed through the corresponding communication interface even without re-performing the corresponding tethering connection through the communication interface (e.g., the first communication interface 512 or the third communication interface 516). In other words, when the electronic device 502 is out of the communication range corresponding to the communication interface (e.g., the first communication interface 512 or the third communication interface 516), the tethering connection through the corresponding communication interface may be disconnected. The processor 540 may determine whether or not the tethering connection of the electronic device 502 is disconnected. The processor 540 may store a tethering history in the memory 540, and when the electronic device 502 re-enters the communication range, the processor 540 may perform an automatic tethering connection on the basis of the tethering history. For example, when a tethering connection performed through the first communication interface 512 or the third communication interface 516 is disconnected during the tethering, an automatic tethering connection may be performed through the communication interface that was connected last on the basis of the tethering history.

The processor 540 may provide an automatic tethering connection function through the first communication interface 512 (e.g., BLE) during the tethering through a tethering connection (e.g., the BT/classic BT-tethering connection) using the second communication interface 514. For example, when the electronic device 502 moves out of the communication range (e.g., about 100 m) corresponding to the second communication interface 514 and then re-enters the communication range, the processor 540 may perform an automatic tethering connection through the first communication interface 512 (e.g., BLE) even without re-performing the tethering connection (e.g., the BT/classic BT-tethering connection) through the second communication interface 514. As a result, even though the second communication interface 514 does not provide an automatic tethering connection function (e.g., an auto-connection function), an automatic tethering connection function is executed by means of the first communication interface 512, thereby providing an automatic tethering connection function even when the tethering connection is performed through the second communication interface 514.

According to various embodiments, an electronic device 502 (e.g., the tethering-receiving device) may include a communication circuit 510 including a plurality of communication interfaces 512, 514, and 516, a processor 540 electrically connected to a plurality of communication interfaces 512, 514 and 516, and a memory 520 electrically connected to the processor 540. The memory 520 may store instructions that cause, when executed, the processor 540 to: receive, from an external electronic device 401 (e.g., a tethering-providing device), information related to the external electronic device 401; select the communication interface to be used for tethering from among the plurality of communication interfaces 512, 514, and 516 on the basis of at least some of the received information; and perform a tethering connection with the external electronic device 401 through the selected communication interface.

According to various embodiments, the information related to the external electronic device 401 may include at least some of information related to the state of the external electronic device 401, information about tethering capability supported by the external electronic device 401, information related to the external network 426 of the external electronic device 401, or combinations thereof.

According to various embodiments, the instructions may include an instruction that causes the processor 540 to select the communication interface to be used for tethering from among the plurality of communication interfaces 512, 514, and 516 on the basis of at least some of information related to the external electronic device 401, information related to the electronic device 502, or a combination thereof.

According to various embodiments, the information related to the electronic device 502 may include at least some of information related to the state of the electronic device 502, tethering capability information of the electronic device 502, a designated tethering usage time, a designated tethering usage location, information on a tethering-related application that is being executed in the electronic device, a tethering usage pattern based on a tethering usage history of the electronic device, or combinations thereof.

According to various embodiments, the instructions may include an instruction that causes the processor 540, when selecting the communication interface to be used for the tethering, to select a first communication interface 512 from among the plurality of communication interfaces 512, 514, and 516 when a first selection criterion is satisfied on the basis of at least some of the received information, to select a second communication interface 514 from among the plurality of communication interfaces 512, 514, and 516 when a second selection criterion is satisfied on the basis of at least some of the received information, and to select a third communication interface 516 from among the plurality of communication interfaces 512, 514, and 516 when a third selection criterion is satisfied on the basis of at least some of the received information.

According to various embodiments, the first communication interface 512 may be BLE, the second communication interface 514 may be BT, and the third communication interface 516 may be WiFi.

According to various embodiments, the first selection criterion may include at least one of the case where the battery level of the external electronic device 401 is less than a first level, the case where the transmission rate of the external network 426 is less than a first transmission rate, the case where the tethering capability of the external electronic device 401 corresponds to the tethering capability through the first communication interface 512, or combinations thereof. The second selection criterion may include at least one of the case where the battery level of the external electronic device 401 is equal to or more than the first level and less than a second level, which is greater than the first level, the case where the transmission rate of the external network 426 is equal to or more than the first transmission rate and less than a second transmission rate, which is greater that the first transmission rate, the case where the tethering capability of the external electronic device 401 corresponds to the tethering capability through the second communication interface 514, or combinations thereof. The third selection criterion may include at least one of the case where the battery level of the external electronic device 401 is equal to or more than the second level, the case where the transmission rate of the external network 426 is equal to or more than the second transmission rate, the case where the tethering capability of the external electronic device 401 corresponds to the tethering capability through the third communication interface 516, or combinations thereof.

According to various embodiments, the instructions may include an instruction that causes the processor 540 to: determine whether or not the tethering connection is disconnected; and when the tethering connection is disconnected, perform an automatic tethering connection through the first communication interface 512, among the plurality of communication interfaces.

According to various embodiments, the instructions may include an instruction that causes the processor 540 to, when the tethering connection is disconnected, perform an automatic tethering connection, and then perform the tethering connection through the communication interface that was connected last on the basis of a tethering communication history.

According to various embodiments, the instructions may include an instruction that causes the processor 540 to determine whether or not a switching criterion for switching the type of tethering connection is satisfied during the tethering through the tethering connection, when the switching criterion is satisfied, select a communication interface corresponding to the switching criterion from among the plurality of communication interfaces 512, 514, and 516, and interrupt (disconnect) the tethering connection and then perform the tethering connection through the selected communication interface.

According to various embodiments, the switching criterion may include at least one of, based on the received information, a change in the selection criterion of a communication interface to be used for tethering, a change in the designated tethering usage time, a change in the designated tethering usage location, a change in the information on the tethering-related application that is being executed in the electronic device, a change in the tethering usage pattern based on a tethering usage history of the electronic device, or combinations thereof.

Figure 6:
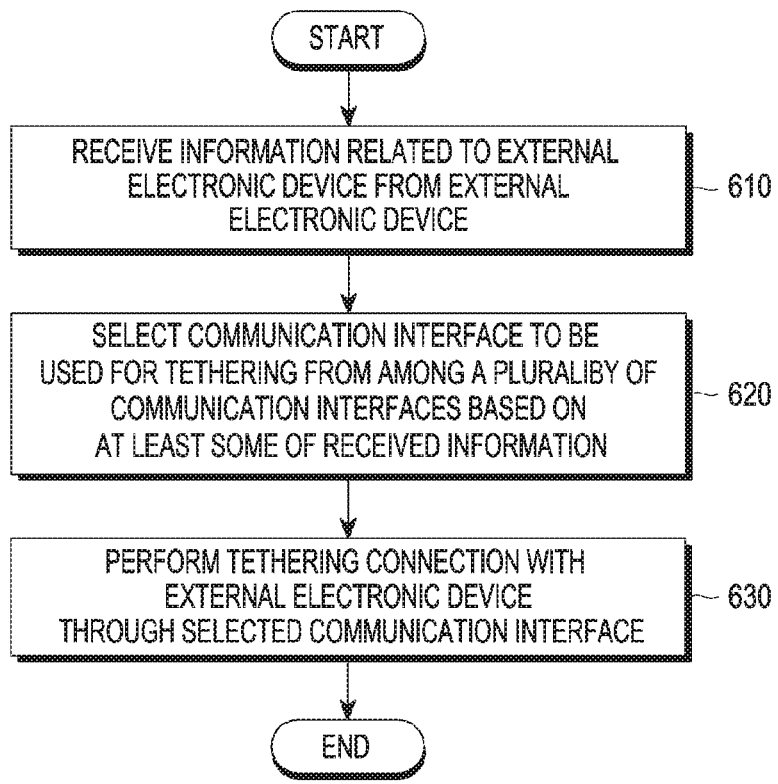
FIG. 6 is a flowchart illustrating a tethering connection method of an electronic device according to various embodiments.

FIG. 6 is a flowchart illustrating a tethering connection method of an electronic device according to various embodiments. The tethering connection method may include operations 610 through 630. The tethering connection method of the electronic device may be executed by an electronic device (e.g., the electronic device 101, 201, 402, or 502) or a processor (e.g., the processor 120, the processor 210, or the processor 540) of the electronic device. For example, the electronic device may be a tethering-receiving device (e.g., the tethering-receiving device 402 or the electronic device 502), and an external electronic device may be a tethering-providing device (e.g., the tethering-providing device 401).

In operation 610, for example, the electronic device may receive information related to the external electronic device from the external electronic device.

For example, when a signal advertised from the external electronic device is received, the electronic device may perform a communication connection with the external electronic device through a first communication interface (e.g., the first communication interface 512), among a plurality of communication interfaces included in the electronic device.

According to an embodiment, the first communication interface may be bluetooth low energy (BLE), and the electronic device may perform a low-power communication connection (e.g., the BLE communication connection) with the external electronic device through the BLE. The electronic device may receive information related to the external electronic device from the external electronic device through the BLE communication connection.

According to an embodiment, the information related to the external electronic device may include information related to the state of the external electronic device, tethering capability information of the external electronic device, information related to an external network (e.g., the external network 426) connected to the external electronic device, or combinations thereof. For example, the information related to the state of the external electronic device may include battery information (e.g., the amount of charge, the remaining amount of power, etc.) of the external electronic device. The tethering capability information of the external electronic device may include the type of at least one communication interface used for the tethering connection supported by the external electronic device, the transmission rate of each communication interface, the power consumption thereof, information on whether or not an automatic tethering connection (e.g., an auto-connection function) is provided, a communication range, and the like. The information related to the external network connected to the external electronic device may include the type of external network, the transmission rate thereof (e.g., 2G, 3G, LTE, or the like), and the like.

In operation 620, for example, the electronic device may select a communication interface to be used for tethering from among the plurality of communication interfaces on the basis of at least some of the received information related to the external electronic device.

According to an embodiment, the electronic device may determine the most optimal communication interface from among the plurality of communication interfaces on the basis of at least some of information related to the state of the external electronic device, tethering capability information of the external electronic device, information related to an external network connected to the external electronic device, or combinations thereof, thereby selecting the corresponding communication interface as the communication interface to be used for tethering.

The plurality of communication interfaces may include, for example, a first communication interface, a second communication interface (e.g., the second communication interface 514), and a third communication interface (e.g., the third communication interface, 516). According to an embodiment, the first communication interface may be BLE, the second communication interface may be BT (e.g., classic BT), and the third communication interface may be WiFi. The BLE may be configured as a separate circuit from that for the BT and the BT module 225 shown in FIG. 2 may support both the BLE and the BT.

According to an embodiment, when a first selection criterion for selecting the communication interface to be used for tethering is satisfied on the basis of at least some of the received information related to the external electronic device, the electronic device may select the first communication interface from among the plurality of communication interfaces. When a second selection criterion for selecting the communication interface to be used for tethering is satisfied on the basis of at least some of the received information related to the external electronic device, the electronic device may select the second communication interface from among the plurality of communication interfaces. When a third selection criterion for selecting the communication interface to be used for tethering is satisfied on the basis of at least some of the received information related to the external electronic device, the electronic device may select the third communication interface from among the plurality of communication interfaces.

According to an embodiment, the first selection criterion may include at least one of the case where the battery level of the external electronic device is less than a first level (e.g., about 10 to 20% of the total battery capacity), the case where the transmission rate of the external network is less than a first transmission rate (e.g., the degree corresponding to 2G), the case where the tethering capability of the external electronic device (e.g., a tethering transmission rate of about 10 Kbps) corresponds to the tethering capability through the first communication interface, or combinations thereof. The second selection criterion may include at least one of the case where the battery level of the external electronic device is equal to or more than the first level and less than a second level (e.g., about 70 to 80% of the total battery capacity), which is greater than the first level, the case where the transmission rate of the external network is equal to or more than the first transmission rate and less than a second transmission rate (e.g., the degree corresponding to 3G), which is greater than the first transmission rate, the case where the tethering capability of the external electronic device (e.g., a tethering transmission rate of about 150 Kbps) corresponds to the tethering capability through the second communication interface, or combinations thereof. The third selection criterion may include at least one of the case where the battery level of the external electronic device is equal to or more than the second level, the case where the transmission rate of the external network is equal to or more than the second transmission rate (e.g., the degree corresponding to LTE), the case where the tethering capability of the external electronic device (e.g., a tethering transmission rate of about 10 to 30 Mbps) corresponds to the tethering capability through the third communication interface, or combinations thereof.

In addition, each of the first, second, and third selection criteria may be automatically selected by the electronic device 502 or the external electronic device, or may have different weights from each other depending on preferences set by the user.

In operation 630, the electronic device may perform a tethering connection with the external electronic device through the selected communication interface.

For example, when the selected communication interface is the first communication interface, the electronic device may perform a tethering connection with the external electronic device by a BLE-tethering connection scheme (e.g., an IPSP or an HPS) using BLE. When the selected communication interface is the second communication interface, the electronic device may perform a tethering connection with the external electronic device by a BT (e.g., classic BT)-tethering connection scheme using BT (e.g., classic BT). When the selected communication interface is the third communication interface, the electronic device may perform a tethering connection with the external electronic device by a WiFi-tethering connection scheme using WiFi.

Figure 7A:
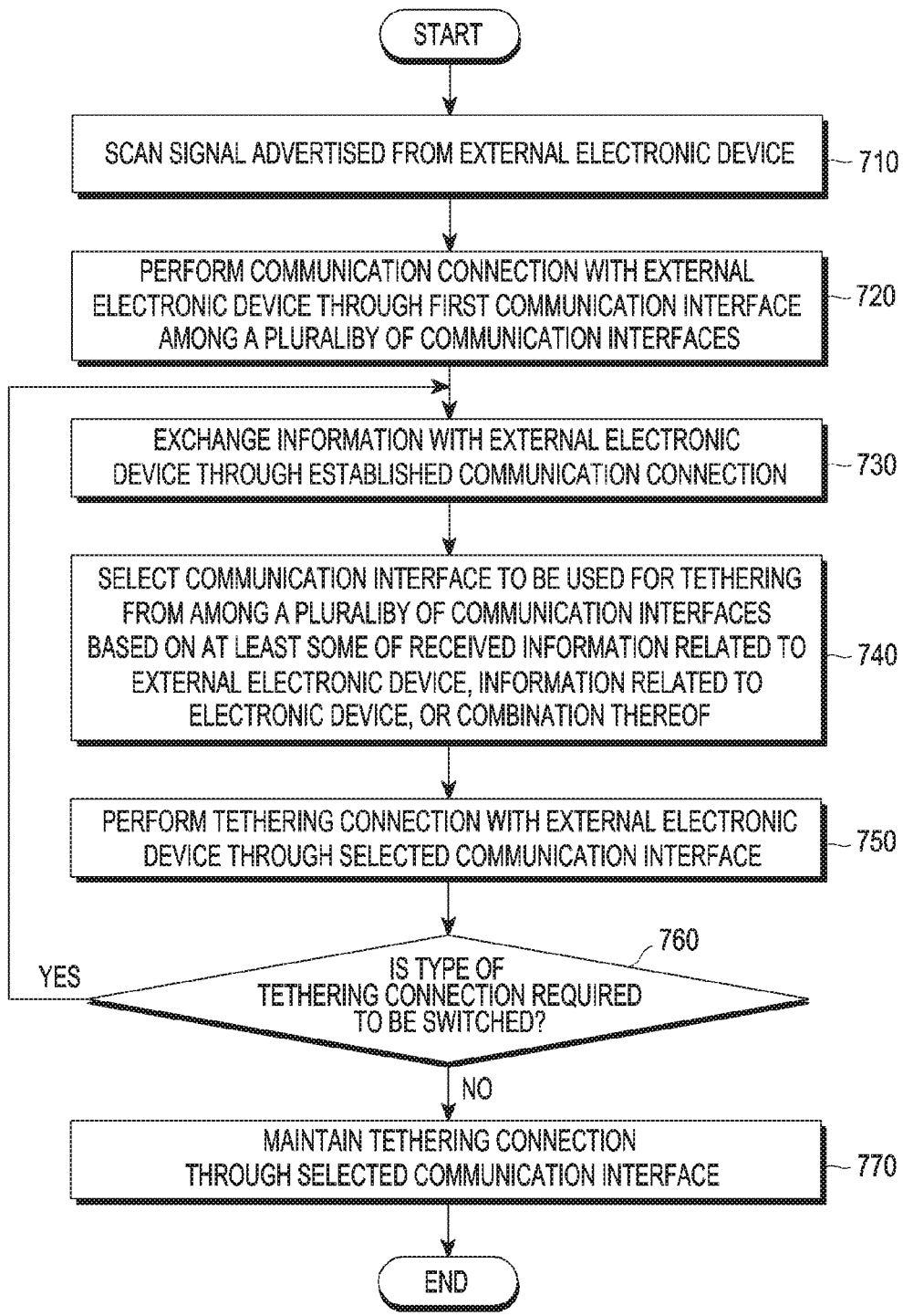
FIGS. 7A, 7B, and 7C are flowcharts illustrating a tethering connection method of an electronic device according to various embodiments.
Figure 7B:
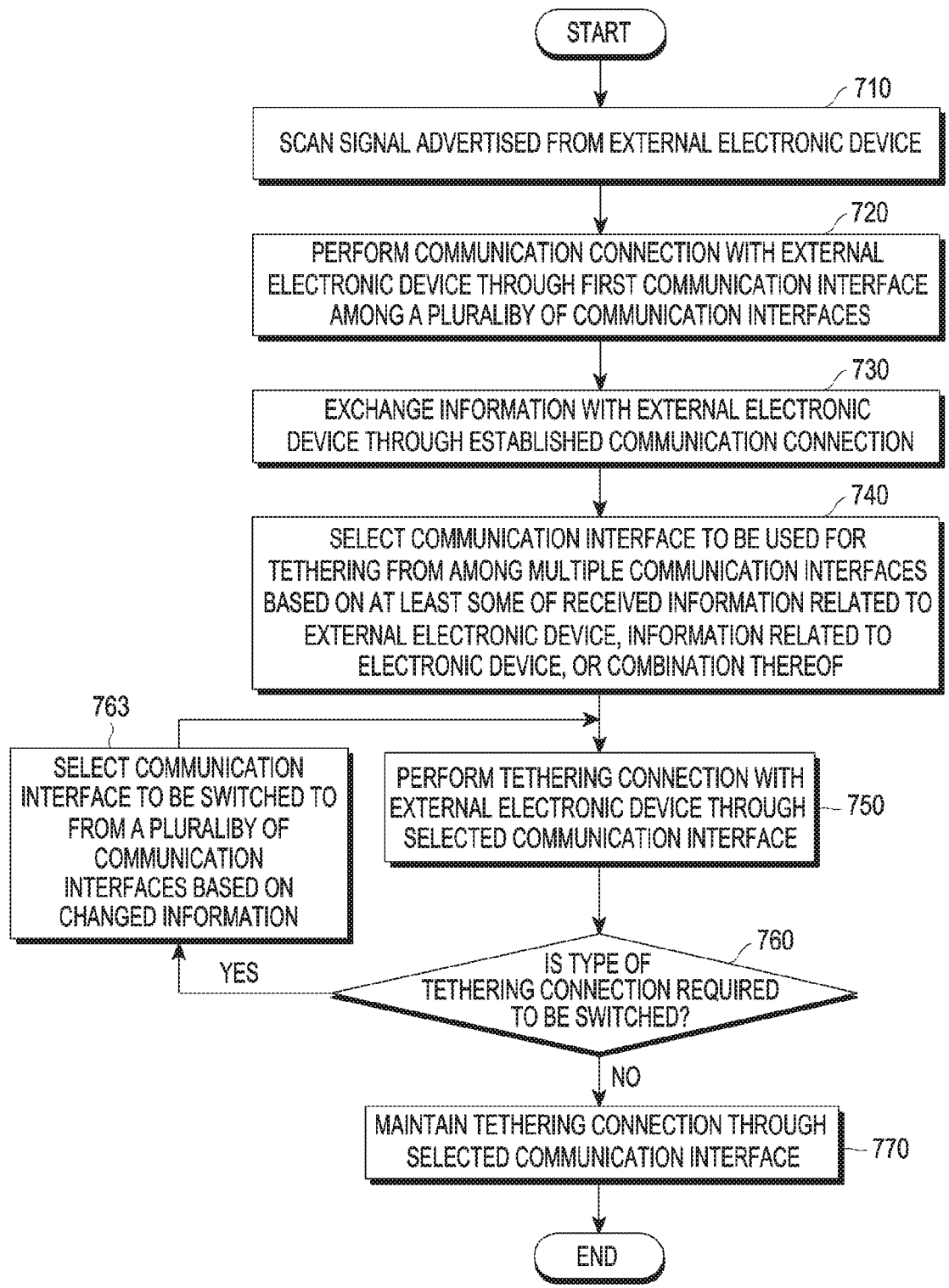
Figure 7C:
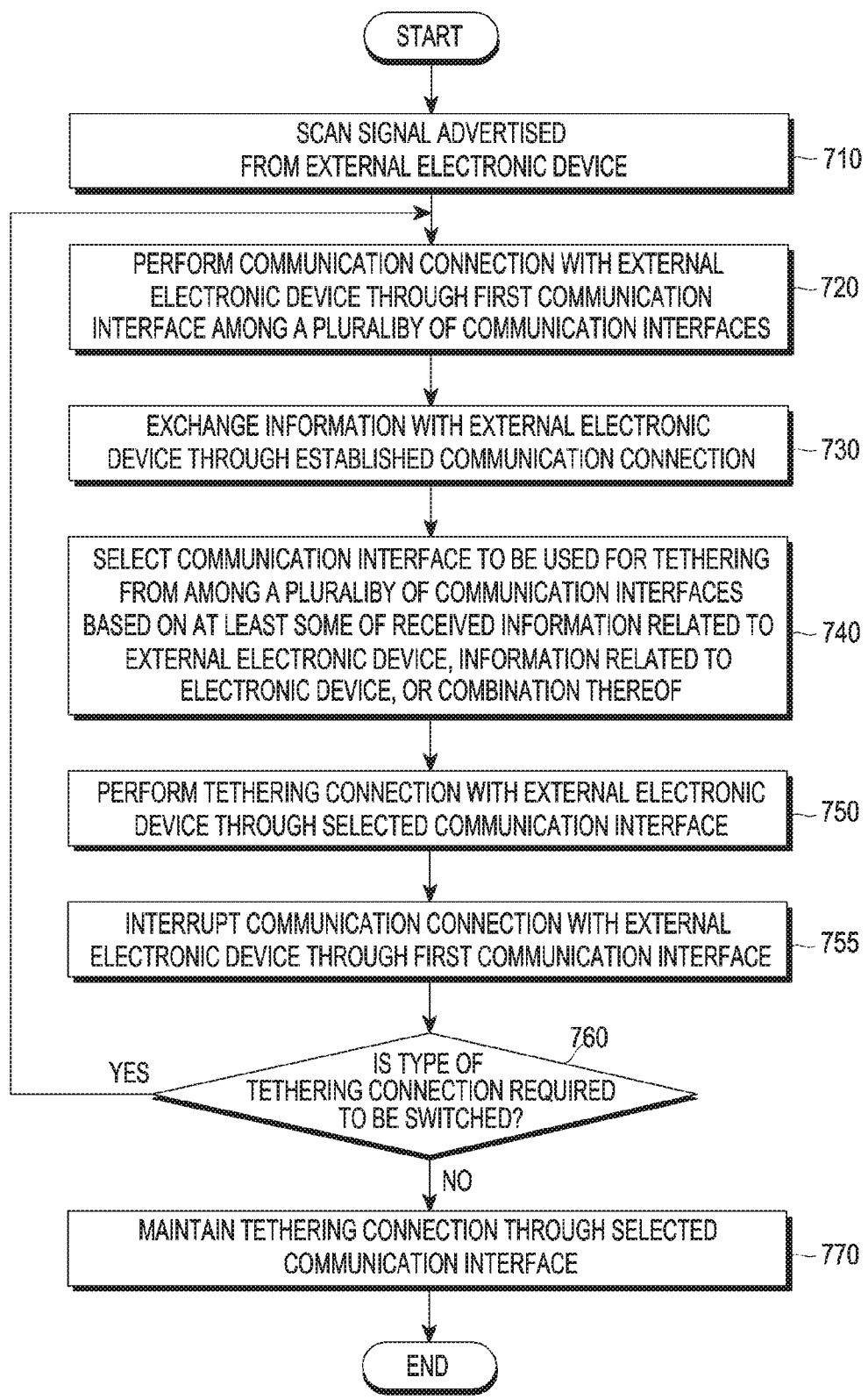

FIGS. 7A, 7B, and 7C are flowcharts illustrating a tethering connection method of an electronic device according to various embodiments. The tethering connection method may include operations 710 to 770. The tethering connection method of the electronic device may be executed by an electronic device (e.g., the electronic device 101, 201, 402, or 502) or a processor (e.g., the processor 120, the processor 210, or the processor 540) of the electronic device. For example, the electronic device may be a tethering-receiving device (e.g., the tethering-receiving device 402 or the electronic device 502), and an external electronic device may be a tethering-providing device (e.g., the tethering-providing device 401). The operations in FIG. 7B are the same as those in FIG. 7A, except for operation 763, and the operations in FIG. 7C are the same as those in FIG. 7A, except for operation 755 and operation 760, so a detailed description of the same operations will be omitted.

Referring to FIG. 7A, in operation 710, for example, the electronic device may scan a signal that is advertised from the external electronic device.

For example, when a tethering service function is activated, the electronic device may scan a signal advertised from the external electronic device. The signal may be a beacon signal, and the beacon signal may include an indication indicating that the external electronic device has a function of providing a tethering service and identification information for identifying the external electronic device.

The electronic device may include a communication circuit (e.g., the communication circuit 510) that includes a plurality of communication interfaces, such as a first communication interface (e.g., the first communication interface 512), a second communication interface (e.g., the second communication interface 514), and a third communication interface (e.g., the third communication interface 516).

According to an embodiment, the first communication interface may be BLE, the second communication interface may be BT (e.g., classic BT), and the third communication interface may be WiFi. The first communication interface (e.g., BLE) and the second communication interface (e.g., BT (classic BT)) may be configured as separate circuits, and the BT module 225 as shown in FIG. 2 may support both the first communication interface (e.g., BLE) and the second communication interface (e.g., BT (classic BT)).

The electronic device, for example, may scan the signal through the first communication interface.

In operation 720, for example, the electronic device may perform a communication connection with an external electronic device through the first communication interface, among the plurality of communication interfaces.

For example, when the scanned signal is received, the electronic device may transmit a communication connection request signal for requesting a communication connection to the external electronic device through the first communication interface. The communication connection request signal may include a communication connection request message for requesting a communication connection using a communication scheme corresponding to the external electronic device and the first communication interface. The electronic device may receive a communication connection response signal from the external electronic device in response to the communication connection request signal. The communication connection response signal may include a communication connection acceptance message for accepting a communication connection using a communication scheme corresponding to the first communication interface. When the communication connection acceptance message is received, the electronic device may perform a communication connection with the external electronic device using a communication scheme corresponding to the first communication interface.

According to an embodiment, the electronic device may perform a communication connection (e.g., the BLE communication connection) with the external electronic device using a BLE communication connection scheme through the first communication interface.

In operation 730, for example, the electronic device may exchange information with the external electronic device through the performed communication connection (e.g., the BLE communication connection).

For example, the electronic device may receive information related to the external electronic device from the external electronic device through the communication connection (e.g., the BLE communication connection) performed using the first communication interface. In addition, the electronic device may transmit information related to the electronic device to the external electronic device through the communication connection (e.g., the BLE communication connection) performed using the first communication interface.

According to an embodiment, the information related to the external electronic device may include at least some of information related to the state of the external electronic device, tethering capability information of the external electronic device, information related to an external network (e.g., the external network 426) connected to the external electronic device, or combinations thereof. For example, the information related to the state of the external electronic device may include battery information (e.g., the amount of charge, the remaining amount of power, etc.) of the external electronic device. The tethering capability information of the external electronic device may include the type of at least one communication interface used for the tethering connection supported by the external electronic device, the transmission rate of each communication interface, the power consumption thereof, information on whether or not an automatic tethering connection (e.g., an auto-connection function) is provided, a communication range, and the like. The information related to the external network may include the type of external network, the transmission rate thereof (e.g., 2G, 3G, LTE, or the like), and the like.

According to an embodiment, the information related to the electronic device may include at least some of information related to the state of the electronic device, tethering capability information of the electronic device, a designated tethering usage time, a designated tethering usage location, information on a tethering-related application that is being executed in the electronic device, a tethering usage pattern based on the tethering usage history of the electronic device, information on the distance between the electronic device and the external electronic device, the reception intensity of the electronic device (e.g., the RSSI), or combinations thereof. For example, the information related to the state of the electronic device may include battery information (e.g., the amount of charge, the remaining amount of power, etc.) of the electronic device. The tethering capability information of the electronic device may include the type of at least one communication interface used for the tethering connection supported by the electronic device, the transmission rate of each communication interface, the power consumption thereof, information on whether or not an automatic tethering connection (e.g., an auto-connection function) is provided, a communication range, and the like. The designated tethering usage time and the designated tethering usage location may be designated by the user, or may be predetermined. The information on the running application in relation to the tethering may be information related to an application when the application (e.g., the Internet, a dialogue application, etc.), to which a tethering service is applicable, is executed after the tethering service is started. The tethering usage pattern may be obtained by analyzing the type of application (e.g., a voice call, FTP, an instant message, broadcasting, navigation, or the like) used in the electronic device through the tethering connection for a predetermined unit time, the usage time, duration, usage location, and usage period of a tethering service for each application, and a tethering usage history of the accumulated amount (size) of tethering data transmission/reception.

In operation 740, for example, the electronic device may determine the most optimal communication interface from among the plurality of communication interfaces on the basis of at least some of the received information related to the external electronic device, the information related to the electronic device, or combinations thereof, thereby selecting the corresponding communication interface as the communication interface to be used for tethering.

According to an embodiment, when a first selection criterion for selecting the communication interface to be used for tethering is satisfied on the basis of at least some of the received information related to the external electronic device, the information related to the electronic device, or combinations thereof, the electronic device may select the first communication interface from among the plurality of communication interfaces. When a second selection criterion for selecting the communication interface to be used for tethering is satisfied on the basis of at least some of the received information related to the external electronic device, the information related to the electronic device, or a combination thereof, the electronic device may select the second communication interface from among the plurality of communication interfaces. When a third selection criterion for selecting the communication interface to be used for tethering is satisfied on the basis of at least some of the received information related to the external electronic device, the information related to the electronic device, or a combination thereof, the electronic device may select the third communication interface from among the plurality of communication interfaces.

According to an embodiment, the first selection criterion may include at least one of the case where the battery level of the external electronic device or the electronic device is less than a first level (e.g., about 10 to 20% of the total battery capacity), the case where the transmission rate of the external network is less than a first transmission rate (e.g., the degree corresponding to 2G), the case where at least one of the tethering capability of the external electronic device (e.g., a tethering transmission rate of about 10 Kbps), the designated tethering usage time, the designated tethering usage location, running applications in relation to the tethering, the tethering usage pattern based on the tethering usage history of the electronic device, information on the distance between the electronic device and the external electronic device, or the signal intensity of the electronic device (e.g., a received signal strength indication; RSSI) corresponds to the tethering capability through the first communication interface, or combinations thereof.

The second selection criterion may include at least one of the case where the battery level of the external electronic device or the electronic device is equal to or more than the first level and less than a second level (e.g., about 70 to 80% of the total battery capacity), which is greater than the first level, the case where the transmission rate of the external network is equal to or more than the first transmission rate and less than a second transmission rate (e.g., the degree corresponding to 3G), which is greater than the first transmission rate, the case where at least one of the tethering capability of the external electronic device (e.g., a tethering transmission rate of about 150 Kbps), the designated tethering usage time, the designated tethering usage location, running applications in relation to the tethering, the tethering usage pattern based on the tethering usage history of the electronic device, information on the distance between the electronic device and the external electronic device, or the signal intensity of the electronic device (e.g., the RSSI) corresponds to the tethering capability through the second communication interface, or combinations thereof.

The third selection criterion may include at least one of the case where the battery level of the external electronic device or the electronic device is equal to or more than the second level, the case where the transmission rate of the external network is equal to or more than the second transmission rate (e.g., the degree corresponding to LTE), the case where the tethering capability of the external electronic device (e.g., a tethering transmission rate of about 10 to 30 Mbps), the designated tethering usage time, the designated tethering usage location, the running application in relation to the tethering, the tethering usage pattern based on the tethering usage history of the electronic device, information on the distance between the electronic device and the external electronic device, or the signal intensity of the electronic device (e.g., the RSSI) corresponds to the tethering capability through the third communication interface, or combinations thereof.

In operation 750, for example, the electronic device may perform a tethering connection with the external electronic device through the selected communication interface.

For example, when the selected communication interface is the first communication interface, the electronic device may perform a tethering connection with the external electronic device by a BLE-tethering connection scheme (e.g., an IPSP or an HPS) using BLE. When the selected communication interface is the second communication interface, the electronic device may perform a tethering connection with the external electronic device by a BT (e.g., classic BT)-tethering connection scheme using BT (e.g., classic BT). When the selected communication interface is the third communication interface, the electronic device may perform a tethering connection with the external electronic device by a WiFi-tethering connection scheme using WiFi.

In operation 760, for example, the electronic device may determine whether or not the type of tethering connection is required to be switched during the tethering through the tethering connection using the selected communication interface.

For example, the electronic device may monitor whether or not at least some of the information related to the electronic device or the information related to the external electronic device is changed during the tethering through the tethering connection, thereby determining whether or not the type of tethering connection is required to be switched. When it is determined that the type of tethering connection is required to be switched, the electronic device may return to operation 730 to thus perform subsequent operations, and when it is determined that the type of tethering connection is not required to be switched, the electronic device may perform operation 770.

According to an embodiment, the electronic device may determine whether or not a switching criterion for switching the type of tethering connection is satisfied on the basis of changed information during the tethering through the tethering connection. When the switching criterion is satisfied, the electronic device may determine that the type of tethering connection is required to be switched.

According to an embodiment, the switching criterion may include at least one of a change in at least some of information included in the selection criteria for a communication interface to be used for tethering, a change in the designated tethering usage time, a change in the designated tethering usage location, a change in the information on the tethering-related application, which is being executed in the electronic device, a change in the tethering usage pattern based on the tethering usage history of the electronic device, information on the designated distance between the electronic device and the external electronic device, the designated signal intensity (e.g., the RSSI) of the electronic device, or combinations thereof.

For example, the electronic device may periodically or aperiodically monitor whether or not at least some of the information included in the selection criterion of the communication interface to be used for tethering is changed. For example, the electronic device may periodically or aperiodically monitor the battery state of the electronic device. When the state of the battery is out of a range set to correspond to the selected communication interface, the electronic device may determine that the type of tethering connection is required to be switched. For example, when the battery level of the electronic device is equal to or more than the first level during the tethering of the electronic device through a tethering connection using the first communication interface, the electronic device may determine that the type of tethering connection is required to be switched. When the battery level of the electronic device is less than the first level or equal to or more than the third level during the tethering of the electronic device through a tethering connection using the second communication interface, the electronic device may determine that the type of tethering connection is required to be switched. When the battery level of the electronic device is less than the third level during the tethering of the electronic device through a tethering connection using the third communication interface, the electronic device may determine that the type of tethering connection is required to be switched.

When the information related to the external electronic device is changed, the external electronic device may transmit the changed information to the electronic device. When the changed information is received from the external electronic device, the electronic device may determine that at least some of the information related to the external electronic device has been changed, and thus may determine that the type of tethering connection is required to be switched.

In operation 770, for example, when it is determined that the type of tethering connection is not required to be switched in operation 760, the electronic device may maintain the tethering connection through the selected communication interface.

For example, when the switching criterion is not satisfied, the electronic device may determine that the type of tethering connection is not required to be switched, and may maintain the tethering connection through the selected communication interface.

According to an embodiment, referring to FIG. 7B, when a tethering connection is performed with the external electronic device in operation 750, a communication connection (e.g., the BLE communication connection) through the first communication interface may be interrupted (disconnected). In this case, in operation 760, for example, when the information related to the electronic device is changed, the electronic device may determine whether or not the type of tethering connection is required to be switched on the basis of the changed information. When it is determined that the type of tethering connection is required to be switched in operation 760, the electronic device may perform operation 763, and when it is determined that the type of tethering connection is not required to be switched, the electronic device may perform operation 770.

In operation 763, for example, when it is determined that the type of tethering connection is required to be switched, the electronic device may select a communication interface to be switched to from among the plurality of communication interfaces on the basis of the changed information. For example, the electronic device may select a communication interface corresponding to the changed information, among the information related to the electronic device, as the communication interface to be switched to. When the communication interface to be switched to is selected, the electronic device may return to operation 750, and may perform subsequent operations. In this case, the electronic device may transmit, to the external electronic device, a tethering-connection-type-switching request signal for switching the tethering connection with the external electronic device by means of the communication interface to be switched to. As a result, the electronic device may switch the type of tethering connection using the communication interface reselected from among the plurality of interfaces.

According to an embodiment, referring to FIG. 7C, for example, in operation 755, when the electronic device performs and performs a tethering connection with the external electronic device through the selected communication interface in operation 750, the electronic device may interrupt (disconnect) the communication connection, which was performed through the first communication interface in operation 720, in operation 755.

For example, in the case where the selected communication interface is the second communication interface or the third communication interface, when a tethering connection with the external electronic device is performed through the second communication interface or the third communication interface, the electronic device may interrupt (disconnect) the communication connection (e.g., the BLE communication connection) through the first communication interface in order to prevent a collision between the communication connection (e.g., the BLE communication connection) through the first communication interface and the tethering connection (e.g., the BT tethering connection or the WiFi tethering connection) through the second communication interface or the third communication interface or power consumption thereof. In this case, when it is determined that the type of tethering connection is required to be switched in operation 760, the electronic device may return to operation 720 to thus perform subsequent operations. In this case, the electronic device may transmit, to the external electronic device, a tethering-connection-type-switching request signal for switching the tethering connection with the external electronic device by means of the communication interface to be switched to in operation 750. As a result, the electronic device may switch the type of tethering connection using the communication interface reselected from among the plurality of interfaces.

According to various embodiments, a tethering connection method of an electronic device may include receiving, from an external electronic device, information related to the external electronic device, selecting the communication interface to be used for tethering from among a plurality of communication interfaces included in a communication circuit of the electronic device on the basis of at least some of the received information, and performing a tethering connection through the selected communication interface.

According to various embodiments, the information related to the external electronic device may include information related to the state of the external electronic device, information about tethering capability supported by the external electronic device, information related to an external network of the external electronic device, or combinations thereof.

According to various embodiments, the method may further include selecting the communication interface to be used for the tethering from among the plurality of communication interfaces on the basis of at least some of information related to the external electronic device, information related to the electronic device, or a combination thereof.

According to various embodiments, the information related to the electronic device may include at least some of information related to a state of the electronic device, tethering capability information of the electronic device, a designated tethering usage time, a designated tethering usage location, information on a tethering-related application that is being executed in the electronic device, a tethering usage pattern based on a tethering usage history of the electronic device, or combinations thereof.

According to various embodiments, selecting the communication interface to be used for the tethering may include selecting a first communication interface from among the plurality of communication interfaces when a first selection criterion is satisfied on the basis of the received information, selecting a second communication interface from among the plurality of communication interfaces when a second selection criterion is satisfied on the basis of the received information, and selecting a third communication interface from among the plurality of communication interfaces when a third selection criterion is satisfied on the basis of the received information.

According to various embodiments, the tethering connection method of the electronic device may further include determining whether or not the tethering connection is disconnected, and when the tethering connection is disconnected, performing an automatic tethering connection through the first communication interface, among the plurality of communication interfaces.

According to various embodiments, the tethering connection method of the electronic device may further include: determining whether or not a switching criterion for switching the type of tethering connection is satisfied during the tethering connection; when the switching criterion is satisfied, selecting a communication interface corresponding to the switching criterion from among the plurality of communication interfaces; and interrupting (disconnecting) the tethering connection and then performing the tethering connection through the selected communication interface.

Figure 8:
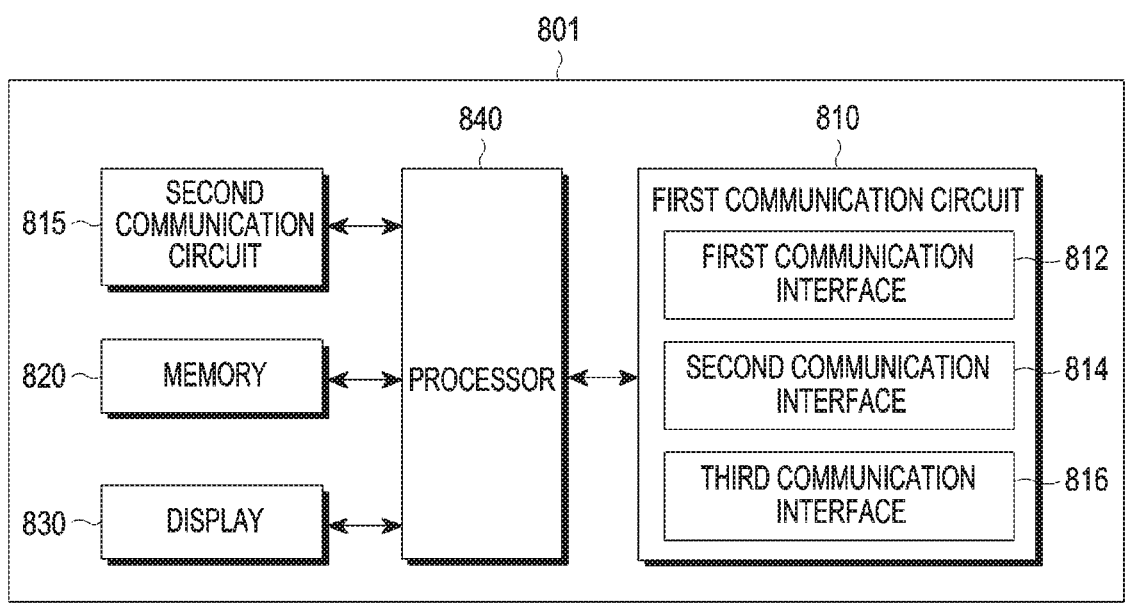
FIG. 8 is a block diagram of an electronic device according to various embodiments.

FIG. 8 is a block diagram of an electronic device according to various embodiments.

Referring to FIG. 8, an electronic device 801 according to various embodiments may include a first communication circuit 810, a second communication circuit 815, a memory 820, a display 830, and at least one processor 840. The electronic device 801 may include all or some of the configurations of the electronic device 101 shown in FIG. 1 or the electronic device 201 shown in FIG. 2. In addition, the electronic device 801 may be a tethering-providing device, and may include all or some of the configuration of the tethering-providing device 401 shown in FIG. 4.

The first communication circuit 810 may include a communication interface capable of providing data based on short-range communication. For example, the communication interface capable of providing data based on short-range communication may include at least one of WiFi, BT, NFC, ZigBee, Z-Wave, or a GNSS.

According to an embodiment, the first communication circuit 810 may include a first communication interface 812, a second communication interface 814, and a third communication interface 816. The first communication interface 812 may be BLE, the second communication interface 814 may be BT (e.g., the BT module 225 shown in FIG. 2), and the third communication interface 816 may be WiFi (e.g., the WiFi module 223 shown in FIG. 2). The BLE may be configured as a separate circuit from that for the BT and the BT module 225 shown in FIG. 2 may support both the (BLE and the BT. In addition, the BT may be, for example, classic BT.

The first communication circuit 810 may perform a tethering connection with the external electronic device (e.g., the electronic device 502) in order to receive a tethering service from the external electronic device 502 through the one or more communication interfaces 812, 814, and 816.

According to an embodiment, the first communication interface 812 may perform a tethering connection with the external electronic device by a bluetooth low energy (BLE)-tethering connection scheme (e.g., an IPSP or an HPS) under the control of the processor 840. The second communication interface 814 may perform a tethering connection with the external electronic device by a BT (e.g., classic BT)-tethering connection scheme under the control of the processor 840. The third communication interface 816 may perform a tethering connection with the external electronic device by a WiFi-tethering connection scheme under the control of the processor 840. In addition, the first communication interface 812 may perform a BLE communication connection with the external electronic device 502.

The second communication circuit 815 may include at least one of communication interfaces capable of providing packet data (or Internet protocol)-based services. For example, the communication interfaces capable of providing packet data (or Internet protocol)-based services may include at least one of computer networks (e.g., LAN or WAN), the Internet, or a telephone network.

The second communication circuit 815 may perform a communication connection with an external network (e.g., the external network 426). The processor 840 may provide a tethering service to the external electronic device 502 such that the external electronic device 502 connected to the electronic device 801 is able to use the services via the external network 426. For example, the external network 426 may include a public network, such as the Internet.

The memory 820 may store commands or data related to one or more other elements of the electronic device 801. The memory 820 may include all or some of the configurations of the memory 130 shown in FIG. 1 or the memory 230 shown in FIG. 2. The memory 820 may store information related to the electronic device 801 or information related to the external electronic device 502, which is received from the external electronic device 502.

According to an embodiment, the information related to the electronic device 801 may include at least some of information related to the state of the electronic device 801, tethering capability information of the electronic device 801, information related to the external network (e.g., the external network 426) connected to the electronic device 801 through the second communication circuit (e.g., the second communication circuit 815), or combinations thereof. For example, the information related to the state of the electronic device 801 may include battery information (e.g., the amount of charge, the remaining amount of power, etc.) of the electronic device 801. The tethering capability information of the electronic device 801 may include the type of at least one communication interface used for the tethering connection supported by the electronic device 801, the transmission rate of each communication interface, the power consumption thereof, information on whether or not an automatic tethering connection (e.g., an auto-connection function) is provided, a communication range, and the like. The information related to the external network connected to the electronic device 801 may include the type of external network, the transmission rate thereof (e.g., 2G, 3G, LTE, or the like), and the like.

According to an embodiment, the information related to the external electronic device 502 may include at least some of information related to the state of the external electronic device 502, tethering capability information of the external electronic device 502, a designated tethering usage time, a designated tethering usage location, information on tethering-related applications supported by or installed in the external electronic device 502, a tethering usage pattern based on the tethering usage history of the external electronic device 502, or combinations thereof. For example, the information related to the state of the external electronic device 502 may include battery information (e.g., the amount of charge, the remaining amount of power, etc.) of the external electronic device 502. The tethering capability information of the external electronic device 502 may include the type of at least one communication interface used for the tethering connection supported by the external electronic device 502, the transmission rate of each communication interface, the power consumption thereof, information on whether or not an automatic tethering connection (e.g., an auto-connection function) is provided, a communication range, and the like. The designated tethering usage time and the designated tethering usage location may be designated by the user, or may be predetermined. The information on the running application in relation to the tethering may be information related to an application when the application (e.g., the Internet, a dialogue application, etc.), to which a tethering service is applicable, is executed after the tethering service is started. The tethering usage pattern, for example, may be obtained by analyzing the type of application (e.g., a voice call, FTP, an instant message, broadcasting, navigation, or the like) used in the external electronic device 502 through the tethering connection for a predetermined unit time, the usage time, duration, usage location, and usage period of a tethering service for each application, and a tethering usage history of the accumulated amount (size) of tethering data transmission/reception.

The display 830 may be arranged between a first surface of the electronic device 801 (e.g., a front surface of the electronic device 801), which is directed in a first direction, and a second surface thereof (e.g., a back surface of the electronic device 801), which is directed in a second direction opposite the first direction, and the upper surface of the display 830 may be exposed through the first surface. In addition, the display 830 may be formed to be large enough to occupy the majority of the first surface of the electronic device 801.

According to an embodiment, the display 830 may include a panel, such as an LCD, an AMOLED, or the like, and may display various images according to various operation states of the electronic device 801, application execution, and/or services.

The processor 840 may control the overall operation of the electronic device 801. The processor 840 may include, for example, all or some of the configurations of the processor 120 shown in FIG. 1 or the processor 210 shown in FIG. 2.

The processor 840 may advertise a signal. For example, when a tethering service function is activated, the processor 840 may periodically or aperiodically advertise a signal to inform surrounding devices of the activation of the tethering service function. For example, the signal may be a beacon signal, and the beacon signal may include an indication indicating that the electronic device 801 has a function of providing a tethering service and identification information for identifying the electronic device. The processor 840 may advertise the signal through, for example, the first communication interface 812 (e.g., BLE).

The processor 840 may perform a communication connection with an external electronic device through the first communication interface 812, among the plurality of communication interfaces.

For example, in response to the advertised signal, the processor 840 may receive, from the external electronic device 502, a communication connection request signal for requesting a communication connection through the first communication interface 812. The communication connection request signal may include a communication connection request message for requesting a communication connection using a communication scheme corresponding to the external electronic device 502 and the first communication interface. The processor 840 may transmit a communication connection response signal to the external electronic device 502 in response to the communication connection request signal. The communication connection response signal may include a communication connection acceptance message for accepting a communication connection using a communication scheme corresponding to the first communication interface. When a response signal to the communication connection acceptance message is received from the external electronic device 502, the processor 840 may perform a communication connection with the external electronic device 502 using a communication scheme corresponding to the first communication interface 812.

According to an embodiment, the processor 840 may perform a communication connection (e.g., the BLE communication connection) with the external electronic device 502 by a BLE communication connection scheme through the first communication interface 812.

The processor 840 may exchange information with the external electronic device 502 through the performed communication connection (e.g., the BLE communication connection).

For example, the processor 840 may receive information related to the external electronic device 502 from the external electronic device 502 through the communication connection performed using the first communication interface 812. In addition, the processor 840 may transmit information related to the electronic device 801 to the external electronic device 502 through the communication connection performed using the first communication interface 812.

The processor 840 may determine an optimal communication interface from among the plurality of communication interfaces on the basis of at least some of the received information related to the external electronic device 502, the information related to the electronic device 801, or combinations thereof.

According to an embodiment, when a first selection criterion for selecting an optimal communication interface to be used for tethering is satisfied on the basis of at least some of the received information related to the external electronic device, the information related to the electronic device, or a combination thereof, the processor 840 may determine the first communication interface, among the plurality of communication interfaces, as to be the optimal communication interface. When a second selection criterion for selecting an optimal communication interface to be used for tethering is satisfied on the basis of at least some of the received information related to the external electronic device, the information related to the electronic device, or combinations thereof, the processor 840 may determine the second communication interface, among the plurality of communication interfaces, as to be the optimal communication interface. When a third selection criterion for selecting an optimal communication interface to be used for tethering is satisfied on the basis of at least some of the received information related to the external electronic device, the information related to the electronic device, or a combination thereof, the processor 840 may determine the third communication interface, among the plurality of communication interfaces, as to be the optimal communication interface.

According to an embodiment, the first selection criterion may include at least one of the case where the battery level of the external electronic device 502 or the electronic device 801 is less than a first level (e.g., about 10 to 20% of the total battery capacity), the case where the transmission rate of the external network 426 is less than a first transmission rate (e.g., the degree corresponding to 2G), the case where at least one of the tethering capability of the electronic device 801 (e.g., a tethering transmission rate of about 10 Kbps), a designated tethering usage time and tethering usage location of the external electronic device 502, a running application in relation to the tethering, or a tethering usage pattern based on the tethering usage history of the external electronic device 502 corresponds to the tethering capability through the first communication interface 812, or combinations thereof.

The second selection criterion may include at least one of the case where the battery level of the external electronic device 502 or the electronic device 801 is equal to or more than the first level and less than a second level (e.g., about 70 to 80% of the total battery capacity), which is greater than the first level, the case where the transmission rate of the external network 426 is equal to or more than the first transmission rate and less than a second transmission rate (e.g., the degree corresponding to 3G), which is greater than the first transmission rate, the case where the tethering capability of the external electronic device 502 (e.g., a tethering transmission rate of about 150 Kbps), a designated tethering usage time or tethering usage location of the external electronic device 502, a running application in relation to the tethering, or a tethering usage pattern based on the tethering usage history of the external electronic device corresponds to the tethering capability through the second communication interface 814, or combinations thereof.

The third selection criterion may include at least one of the case where the battery level of the external electronic device 502 or the electronic device 801 is equal to or more than the second level, the case where the transmission rate of the external network 426 is equal to or more than the second transmission rate (e.g., the degree corresponding to LTE), the case where the tethering capability of the external electronic device 502 (e.g., a tethering transmission rate of about 10 to 30 Mbps), a designated tethering usage time or tethering usage location of the external electronic device, a running application in relation to the tethering, or a tethering usage pattern based on the tethering usage history of the external electronic device corresponds to the tethering capability through the third communication interface 816, or combinations thereof.

The processor 840 may transmit the tethering capability information of the determined communication interface to the external electronic device 502.

For example, when the determined communication interface is the first communication interface 812, the processor 840 may transmit, to the external electronic device 502, first tethering capability information of the first communication interface 812. For example, the first tethering capability information may include the type (e.g., BLE), the transmission rate (e.g., about 10 Kbps), and the power consumption (e.g., standby/connection current of less than about 1 mA) of the first communication interface, information on whether or not an automatic tethering connection (e.g., an auto-connection function) is supported (e.g., supported), a communication range thereof (e.g., about 100 m), and the like.

When the determined communication interface is the second communication interface 814, the processor 840 may transmit, to the external electronic device 502, second tethering capability information of the second communication interface 814. For example, the second tethering capability information may include the type (e.g., BT or classic BT), the transmission rate (e.g., about 150 Kbps), and the power consumption (e.g., standby current of less than about 1 mA and connection current of 20 to 30 mA) of the second communication interface 814, information on whether or not an automatic tethering connection (e.g., an auto-connection function) is supported (e.g., not supported), the communication range thereof (e.g., about 100 m), and the like.

When the determined communication interface is the third communication interface 816, the processor 840 may transmit, to the external electronic device 502, third tethering capability information of the third communication interface 816. For example, the third tethering capability information may include the type (e.g., WiFi), the transmission rate (e.g., about 10 to 30 Mbps), and the power consumption (e.g., standby current of about 100 mA and connection current of 100 to 200 mA) of the third communication interface 816, information on whether or not an automatic tethering connection (e.g., an auto-connection function) is supported (e.g., supported), a communication range thereof (e.g., about 140 m to 250 m), and the like.

The processor 840 may perform a tethering connection through the communication interface requested by the external electronic device 502.

For example, when a tethering connection request signal for requesting a tethering connection through the communication interface requested by the external electronic device 502 is received, the processor 840 may perform the tethering connection by a tethering connection scheme corresponding to the requested communication interface. The external electronic device 502, for example, may make a request for a tethering connection through the communication interface selected from among the plurality of communication interfaces on the basis of the tethering capability information of the communication interface determined by the electronic device 801.

For example, when the requested communication interface is the first communication interface 812 (e.g., BLE), the processor 840 may perform a tethering connection with the external electronic device 502 by a BLE-tethering connection scheme (e.g., an IPS or an HPS). When the selected communication interface is the second communication interface 814 (e.g., BT/classic BT), the processor 840 may perform a tethering connection with the external electronic device 502 by a BT (e.g., classic BT)-tethering connection scheme. When the selected communication interface is the third communication interface 816 (e.g., WiFi), the processor 840 may perform a tethering connection with the external electronic device 502 by a WiFi-tethering connection scheme.

Meanwhile, when at least some of the information related to the electronic device 801 is changed after a tethering connection is performed with the external electronic device 502 by the tethering connection operation described above, the processor 840 may detect the same, and may transmit the changed information to the external electronic device 502 through the communication connection (e.g., the BLE communication connection) performed using the first communication interface 812. The processor 840 may receive, from the external electronic device 502, a tethering-connection-type-switching request signal for switching the tethering connection through the communication interface corresponding to the changed information. When the switching request signal is received, the processor 840 may re-perform the tethering connection by a tethering connection scheme corresponding to the communication interface to which switching was requested, thereby switching the type of tethering connection.

According to various embodiments, an electronic device 801 (e.g., the tethering-providing device) may include a first communication circuit 810 that includes a plurality of communication interfaces 812, 814, and 816 in communication with at least one external electronic device 502 (e.g., the tethering-receiving device), a second communication circuit 815 in communication with the external network 426, a processor 840 electrically connected to the first and second communication circuits 810 and 815, and a memory 820 electrically connected to the processor 840. The memory 820 may store instructions that cause, when executed, the processor 840 to: receive, from at least one external electronic device 502, information related to the at least one external electronic device 502 through the first communication circuit 810; select a communication interface to be used for tethering services provided from the external network 426 to the at least one external electronic device 502 from among the plurality of communication interfaces 812, 814, and 816 on the basis of at least some of the received information; and transmit the tethering capability of the selected communication interface to the at least one external electronic device.

Figure 9:
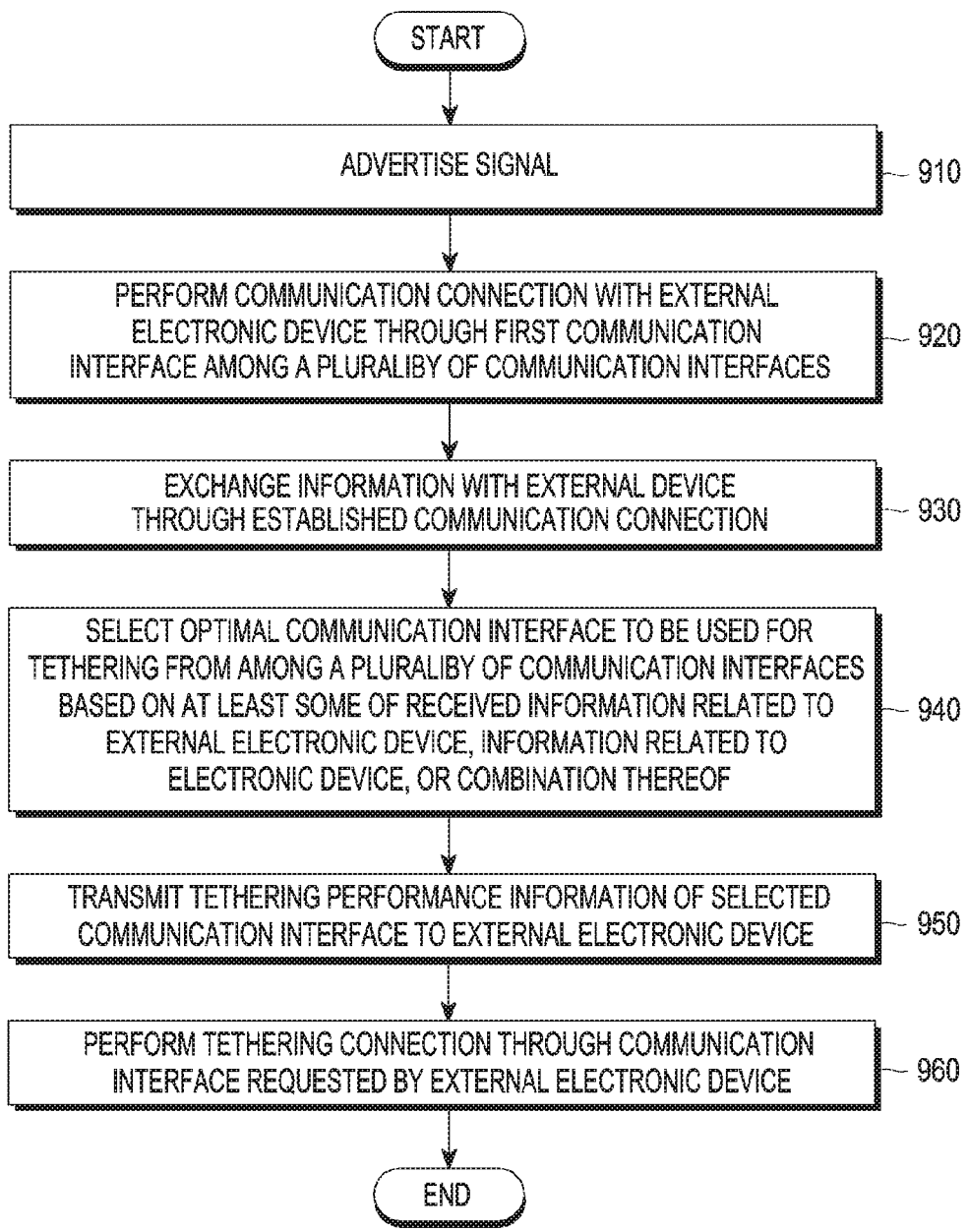
FIG. 9 is a flowchart illustrating a tethering connection method of an electronic device according to various embodiments.

According to various embodiments, the instructions may include an instruction that causes the processor 840 to select a communication interface used for the tethering from among the plurality of communication 812, 814, and 816 interfaces on the basis of at least some of information related to the at least one external electronic device 502, information related to the electronic device 801, or combinations thereof FIG. 9 is a flowchart illustrating a tethering connection method of an electronic device according to various embodiments. The tethering connection method may include operations 910 to 960. The tethering connection method of the electronic device may be executed by an electronic device (e.g., the electronic device 101, 201, 401, or 801) or a processor (e.g., the processor 120, the processor 210, or the processor 840) of the electronic device. For example, the electronic device may be a tethering-providing device (e.g., the tethering-providing device 401 or the electronic device 801), and the external electronic device may be a tethering-receiving device (e.g., the tethering-receiving device 402 or the electronic device 502).

In operation 910, for example, the electronic device may advertise a signal.

For example, when a tethering service function is activated, the electronic device may periodically or aperiodically advertise a signal to inform the surrounding devices of the activation of the tethering service function. For example, the signal may be a beacon signal, and the beacon signal may include an indication indicating that the electronic device has a function of providing a tethering service and identification information for identifying the electronic device. The electronic device may advertise the signal through, for example, BLE.

The electronic device may include a first communication circuit (e.g., the first communication circuit 810) that includes a plurality of communication interfaces for performing a tethering connection, and the first communication circuit may include, for example, a first communication interface (e.g., the first communication interface 812), a second communication interface (e.g., the second communication interface 814), and a third communication interface (e.g., the third communication interface 816).

According to an embodiment, the first communication interface may be BLE, the second communication interface may be BT (e.g., classic BT), and the third communication interface may be WiFi.

The electronic device may advertise the signal through, for example, the first communication interface.

In operation 920, for example, the electronic device may perform a communication connection with an external electronic device through the first communication interface, among the plurality of communication interfaces.

For example, in response to the advertised signal, the electronic device may receive, from the external electronic device, a communication connection request signal for requesting a communication connection through the first communication interface. The communication connection request signal may include a communication connection request message for requesting a communication connection using a communication scheme corresponding to the external electronic device and the first communication interface. The electronic device may transmit a communication connection response signal to the external electronic device in response to the communication connection request signal. The communication connection response signal may include a communication connection acceptance message for accepting a communication connection using a communication scheme corresponding to the first communication interface. When a response signal to the communication connection acceptance message is received from the external electronic device, the electronic device may perform a communication connection with the external electronic device using a communication scheme corresponding to the first communication interface.

According to an embodiment, the electronic device may perform a communication connection (e.g., the BLE communication connection) with the external electronic device by a BLE communication connection scheme through the first communication interface.

In operation 930, for example, the electronic device may exchange information with the external electronic device through the performed communication connection.

For example, the electronic device may receive information related to the external electronic device from the external electronic device through the communication connection performed using the first communication interface. In addition, the electronic device may transmit information related to the electronic device to the external electronic device through the communication connection performed using the first communication interface.

According to an embodiment, the information related to the electronic device may include at least some of information related to the state of the electronic device, tethering capability information of the electronic device, information related to an external network (e.g., the external network 426) connected to the electronic device through the second communication circuit (e.g., the second communication circuit 815), or combinations thereof. For example, the information related to the state of the electronic device may include battery information (e.g., the amount of charge, the remaining amount of power, etc.) of the electronic device. The tethering capability information of the electronic device may include the type of at least one communication interface used for the tethering connection supported by the electronic device, the transmission rate of each communication interface, the power consumption thereof, information on whether or not an automatic tethering connection (e.g., an auto-connection function) is provided, a communication range thereof, and the like. The information related to the external network may include the type of external network, the transmission rate thereof (e.g., 2G, 3G, LTE, or the like), and the like.

According to an embodiment, the information related to the external electronic device may include at least some of information related to the state of the external electronic device, tethering capability information of the external electronic device, a designated tethering usage time and a designated tethering usage location of the external electronic device, information on a tethering-related application that is being executed in the external electronic device, a tethering usage pattern based on the tethering usage history of the external electronic device, or combinations thereof. For example, the information related to the state of the external electronic device may include battery information (e.g., the amount of charge, the remaining amount of power, etc.) of the external electronic device. The tethering capability information of the external electronic device may include the type of at least one communication interface used for the tethering connection supported by the electronic device, the transmission rate of each communication interface, the power consumption thereof, information on whether or not an automatic tethering connection (e.g., an auto-connection function) is provided, a communication range, and the like. The designated tethering usage time and the designated tethering usage location may be designated by the user, or may be predetermined. The information on the running application in relation to the tethering may be information related to an application when the application (e.g., the Internet, a dialogue application, etc.), to which a tethering service is applicable, is executed after the tethering service is started. The tethering usage pattern, for example, may be obtained by analyzing the type of application (e.g., a voice call, FTP, an instant message, broadcasting, navigation, or the like) used in the external electronic device through the tethering connection for a predetermined unit time, the usage time, duration, usage location, and usage period of a tethering service for each application, and a tethering usage history of the accumulated amount (size) of tethering data transmission/reception.

In operation 940, for example, the electronic device may select the optimal communication interface to be used for tethering from among the plurality of communication interfaces on the basis of at least some of the received information related to the external electronic device, the information related to the electronic device, or combinations thereof.

According to an embodiment, when a first selection criterion for selecting an optimal communication interface to be used for tethering is satisfied on the basis of at least some of the received information related to the external electronic device, the information related to the electronic device, or a combination thereof, the electronic device may select the first communication interface, among the plurality of communication interfaces, as the optimal communication interface. When a second selection criterion for selecting an optimal communication interface to be used for tethering is satisfied on the basis of at least some of the received information related to the external electronic device, the information related to the electronic device, or a combination thereof, the electronic device may select the second communication interface, among the plurality of communication interfaces, as the optimal communication interface. When a third selection criterion for selecting an optimal communication interface to be used for tethering is satisfied on the basis of at least some of the received information related to the external electronic device, the information related to the electronic device, or a combination thereof, the electronic device may select the third communication interface, among the plurality of communication interfaces, as the optimal communication interface.

According to an embodiment, the first selection criterion may include at least one of the case where the battery level of the external electronic device or the electronic device is less than a first level (e.g., about 10 to 20% of the total battery capacity), the case where the transmission rate of the external network is less than a first transmission rate (e.g., the degree corresponding to 2G), the case where at least one of the tethering capability of the electronic device (e.g., a tethering transmission rate of about 10 Kbps), the designated tethering usage time or the designated tethering usage location of the external electronic device, running applications in relation to the tethering, the tethering usage pattern based on the tethering usage history of the external electronic device, information on the distance between the electronic device and the external electronic device, or the signal intensity of the electronic device (e.g., the RSSI) corresponds to the tethering capability through the first communication interface, or combinations thereof.

The second selection criterion may include at least one of the case where the battery level of the external electronic device or the electronic device is equal to or more than the first level and less than a second level (e.g., about 70 to 80% of the total battery capacity), which is greater than the first level, the case where the transmission rate of the external network is equal to or more than the first transmission rate and less than a second transmission rate (e.g., the degree corresponding to 3G), which is greater than the first transmission rate, or the case where at least one of the tethering capability of the external electronic device (e.g., a tethering transmission rate of about 150 Kbps), the designated tethering usage time or the designated tethering usage location of the external electronic device, the running application in relation to the tethering, the tethering usage pattern based on the tethering usage history of the external electronic device, information on the distance between the electronic device and the external electronic device, or the signal intensity of the electronic device (e.g., the RSSI) corresponds to the tethering capability through the second communication interface, or combinations thereof.

The third selection criterion may include at least one of the case where the battery level of the external electronic device or the electronic device is equal to or more than the second level, the case where the transmission rate of the external network is equal to or more than the second transmission rate (e.g., the degree corresponding to LTE), the case where at least one of the tethering capability of the external electronic device (e.g., a tethering transmission rate of about 10 to 30 Mbps), the designated tethering usage time or the designated tethering usage location of the external electronic device, the running application in relation to the tethering, the tethering usage pattern based on the tethering usage history of the external electronic device, information on the distance between the electronic device and the external electronic device, or the signal intensity of the electronic device (e.g., the RSSI) corresponds to the tethering capability through the third communication interface, or combinations thereof.

In operation 950, for example, the electronic device may transmit the tethering capability information of the selected communication interface to the external electronic device.

For example, when the selected communication interface is the first communication interface, the electronic device may transmit, to the external electronic device, first tethering capability information of the first communication interface. For example, the first tethering capability information may include the type (e.g., BLE), the transmission rate (e.g., about 10 Kbps), and the power consumption (e.g., standby/connection current of less than about 1 mA) of the first communication interface, information on whether or not an automatic tethering connection (e.g., an auto-connection function) is supported (e.g., supported), a communication range thereof (e.g., about 100 m), and the like.

When the selected communication interface is the second communication interface, the electronic device may transmit, to the external electronic device, second tethering capability information of the second communication interface. For example, the second tethering capability information may include the type (e.g., BT or classic BT), the transmission rate (e.g., about 150 Kbps), and the power consumption (e.g., standby current of less than about 1 mA and connection current of 20 to 30 mA) of the second communication interface, information on whether or not an automatic tethering connection (e.g., an auto-connection function) is supported (e.g., not supported), a communication range thereof (e.g., about 100 m), and the like.

When the selected communication interface is the third communication interface, the electronic device may transmit, to the external electronic device, third tethering capability information on the third communication interface. For example, the third tethering capability information may include the type (e.g., WiFi), the transmission rate (e.g., about 10 to 30 Mbps), and the power consumption (e.g., standby current of about 100 mA and connection current of 100 to 200 mA) of the third communication interface, information on whether or not an automatic tethering connection (e.g., an auto-connection function) is supported (e.g., supported), a communication range thereof (e.g., about 140 m to 250 m), and the like.

In operation 960, the electronic device may perform a tethering connection through the communication interface requested by the external electronic device.

For example, when a tethering connection request signal for requesting a tethering connection through the communication interface requested by the external electronic device is received, the electronic device may perform the tethering connection by a tethering connection scheme corresponding to the requested communication interface. The external electronic device, for example, may make a request for a tethering connection through the communication interface selected from among the plurality of communication interfaces on the basis of the tethering capability information of the communication interface selected by the electronic device.

For example, when the requested communication interface is the first communication interface, the electronic device may perform a tethering connection with the external electronic device by a BLE-tethering connection scheme (e.g., an IPSP or an HPS) through BLE. When the selected communication interface is the second communication interface, the electronic device may perform a tethering connection with the external electronic device by a BT (e.g., classic BT)-tethering connection scheme through BT (e.g., classic BT). When the selected communication interface is the third communication interface, the electronic device may perform a tethering connection with the external electronic device by a WiFi-tethering connection scheme through WiFi.

Meanwhile, although it is not shown in the drawings, when at least some of the information related to the electronic device is changed after a tethering connection is performed with the external electronic device through the tethering connection operation described above, the electronic device may detect the same, and may transmit the changed information to the external electronic device through the communication connection performed by means of the first communication interface. The electronic device may receive, from the external electronic device, a tethering-connection-type-switching request signal for switching the tethering connection through the communication interface corresponding to the changed information. When the switching request signal is received, the electronic device may re-perform the tethering connection by the tethering connection scheme corresponding to the communication interface to which switching was requested, thereby switching the type of tethering connection.

Figure 10A:
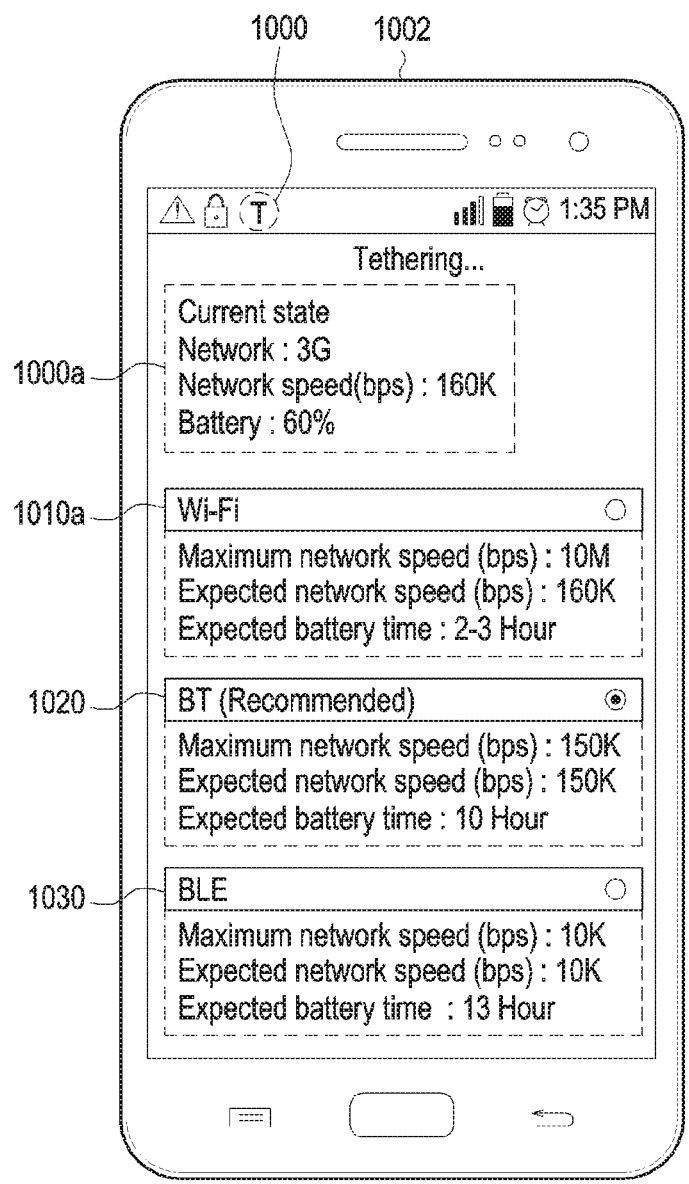
FIGS. 10A and 10B are diagrams illustrating an example of a user interface (UI) showing the tethering operation of an electronic device according to various embodiments.
Figure 10B:
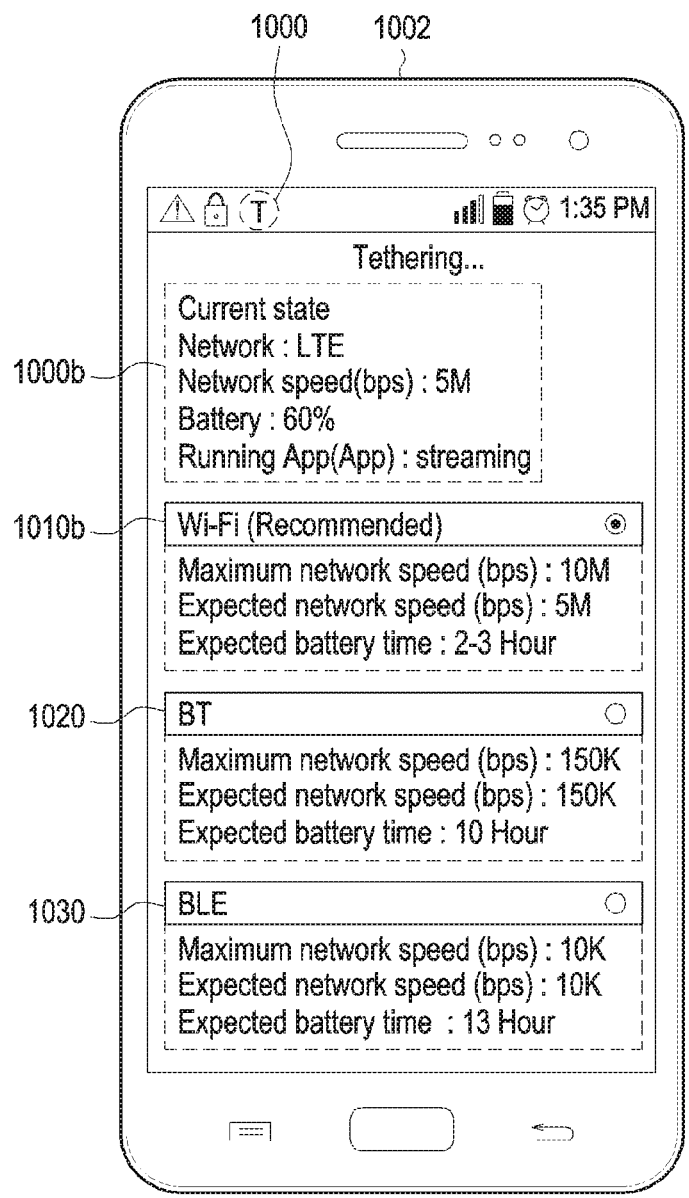

FIGS. 10A and 10B are diagrams illustrating an example of a user interface (UI) showing the tethering operation of an electronic device according to various embodiments. The electronic device 1002 may be a tethering-receiving device, and may include all or some of the configurations of the tethering-receiving device 502 shown in FIG. 5. In addition, the electronic device 1002 may include all or some of the configuration of the electronic device 101 shown in FIG. 1 or the electronic device 201 shown in FIG. 2.

Referring to FIGS. 10A and 10B, the electronic device 1002 according to various embodiments may display an indication or icon 1000 (e.g., 'T'), which indicates that a tethering service is being provided, in a state indication portion at the top of the screen of the electronic device 1002 while a tethering service is being executed. In addition, the electronic device 1002 may display, on the screen, state information 1000a or 1000b of the electronic device 1002 and state information 1010a, 1010b, 1020, or 1030 of a tethering connection scheme supported by the electronic device 1002.

Referring to FIG. 10A, for example, the state information 1000a of the electronic device 1002 may show that the type of network connected to the electronic device 1002 is 3G, the current transmission rate of the network (a network speed) is 160 Kbps, and the remaining power of the battery is 60%.

When a tethering connection scheme through a first communication interface (e.g., BLE) is selected for a tethering connection based on the state information 1000a of the electronic device 1002 described above, the state information 1030 of the first communication interface may show that the type of network is BLE, the maximum network speed that can be supported by BLE is 10 Kbps, the currently expected network speed is 10 Kbps, and the expected usable battery time is 13 hours. In addition, when a tethering connection scheme through a second communication interface (e.g., BT (classic BT)) is selected for a tethering connection, the state information 1020 on the second communication interface may show that the type of network is BT, the maximum network speed that can be supported by BT is 150 Kbps, the currently expected network speed is 150 Kbps, and the expected usable battery time is 10 hours. In addition, when a tethering connection scheme through a third communication interface (e.g., WiFi) is selected for a tethering connection, the state information 1010a of the third communication interface may show that the type of network is WiFi, the maximum network speed that can be supported by the WiFi is 10 Mbps, the currently expected network speed is 160 Kbps, and the expected usable battery time is 2 to 3 hours.

In this case, based on the state information 1000a of the electronic device 1002 and the state information 1010a, 1020, and 1030 of a plurality of communication interfaces, the electronic device 1002 may automatically select the most optimal communication interface for performing a tethering connection, or may provide recommendation information to cause the user to select the most optimal communication interface. For example, in the case of the state shown in FIG. 10A, the electronic device 1002 may automatically select the second communication interface 1020 (e.g., BT) having the longest usable battery time from among the communication interfaces 1010a and 1020 (e.g., WiFi and BT) whose network speeds approximate the current network speed (e.g., 160 Kbps) of the electronic device 1002, or may recommend the second communication interface 1020 (e.g., BT) to the user.

Referring to FIG. 10B, for example, the state information 1000b of the electronic device 1002 may show that the type of network connected to the electronic device 1002 is LTE, the current network speed is 5 Mbps, the remaining power of the battery is 60%, and predetermined data streaming is detected for the currently used application or the recently used application.

When a tethering connection scheme through a first communication interface (e.g., BLE) is selected for a tethering connection based on the state information 1000b of the electronic device 1002 described above, the state information 1030 of the first communication interface may show that the type of network is BLE, the maximum network speed that can be supported by the BLE is 10 Kbps, the currently expected network speed is 10 Kbps, and the expected usable battery time is 13 hours. In addition, when a tethering connection scheme through a second communication interface (e.g., BT (classic BT)) is selected for a tethering connection, the state information 1020 of the second communication interface may show that the type of network is BT, the maximum network speed that can be supported by BT is 150 Kbps, the currently expected network speed is 150 Kbps, and the expected usable battery time is 10 hours. In addition, when a tethering connection scheme through a third communication interface (e.g., WiFi) is selected for a tethering connection, the state information 1010b of the third communication interface may show that the type of network is WiFi, the maximum network speed that can be supported by the WiFi is 10 Mbps, the currently expected network speed is 5 Mbps, and the expected usable battery time is 2 to 3 hours.

In this case, based on the state information 1000b of the electronic device 1002 and the state information 1010b, 1020, and 1030 of a plurality of communication interfaces, the electronic device 1002 may automatically select the most optimal communication interface for performing a tethering connection, or may provide recommendation information to cause the user to select the most optimal communication interface. For example, in the case of the state shown in FIG. 10B, the electronic device 1002 may automatically select the third communication interface 1010b (e.g., WiFi) whose network speed approximates the current network speed (e.g., 5 Mbps) of the electronic device 1002, or may recommend the third communication interface 1010b (e.g., WiFi) to the user.

According to various embodiments, a recording medium may store commands that cause, when executed by at least one processor, the at least one processor to perform one or more operations, wherein the one or more operations may include: receiving, from an external electronic device, information related to the external electronic device; selecting a communication interface to be used for tethering from among a plurality of communication interfaces included in a communication circuit of the electronic device on the basis of at least some of the received information; and performing a tethering connection through the selected communication interface.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The invention claimed is:
1. An electronic device comprising:
   a communication circuit comprising a plurality of communication interfaces comprising a first communication interface, a second communication interface, and a third communication interface;
   a processor electrically connected to the plurality of communication interfaces; and
   a memory electrically connected to the processor,
   wherein the memory stores instructions that cause, when executed, the processor to:
     receive, from an external electronic device, information related to the external electronic device through the first communication interface;
     select a communication interface to be used for tethering from among the plurality of communication interfaces on the basis of at least some of the received information; and
     perform a tethering connection with the external electronic device through the communication interface,
   wherein the instructions comprise an instruction that causes, when selecting the communication interface to be used for the tethering, the processor to:
     select the second communication interface from among the plurality of communication interfaces based on (1) at least one of a first battery level of the external electronic device or a second battery level of the electronic device being less than a first level and (2) a transmission rate of an external network connected with the external electronic device less than a first rate, and
     select the third communication interface from among the plurality of communication interfaces based on (1) both of the first battery level of the external electronic device and the second battery level of the electronic device being equal to or more than the first level and (2) a transmission rate of the external network connected with the external electronic device being equal to or more than the first rate,
   wherein the first battery level of the external electronic device and the transmission rate of the external network are included in the received information, and
   wherein the first communication interface is a Bluetooth low energy (BLE) communication interface, the second communication interface is a Bluetooth (BT) commu- nication interface, and the third communication interface is a Wi-Fi communication interface.

2. The electronic device of claim 1, wherein the information related to the external electronic device comprises at least some of information related to a state of the external electronic device, information about tethering capability supported by the external electronic device, information related to the external network of the external electronic device, or combinations thereof.

3. The electronic device of claim 1, wherein the instructions comprise an instruction that causes the processor to select the communication interface to be used for tethering from among the plurality of communication interfaces on the basis of at least some of information related to the external electronic device, information related to the electronic device, or combinations thereof.

4. The electronic device of claim 3, wherein the information related to the electronic device comprises at least some of information related to a state of the electronic device, tethering capability information of the electronic device, a designated tethering usage time, a designated tethering usage location, information on a tethering-related application that is being executed in the electronic device, a tethering usage pattern based on a tethering usage history of the electronic device, or combinations thereof.

5. The electronic device of claim 1, wherein the instructions comprise an instruction that causes the processor to:
determine whether or not the tethering connection is disconnected; and
when the tethering connection is disconnected, perform an automatic tethering connection through the first communication interface, among the plurality of communication interfaces.

6. The electronic device of claim 5, wherein the instructions comprise an instruction that causes the processor to, when the tethering connection is disconnected, perform the automatic tethering connection through a most recently connected communication interface on the basis of a tethering communication history.

7. The electronic device of claim 1, wherein the instructions comprise an instruction that causes the processor to:
determine whether or not a switching criterion for switching the type of tethering connection is satisfied during the tethering through the tethering connection;
when the switching criterion is satisfied, select another communication interface corresponding to the switching criterion from among the plurality of communication interfaces; and
interrupt the tethering connection and perform the tethering connection through the other selected communication interface.

8. The electronic device of claim 7, wherein the switching criterion comprises at least one of, based on the received information, a change in the selection criterion of a communication interface to be used for tethering, a change in the designated tethering usage time, a change in the designated tethering usage location, a change in the information on a tethering-related application that is being executed in the electronic device, a change in the tethering usage pattern based on a tethering usage history of the electronic device, or combinations thereof.

9. A tethering connection method of an electronic device comprising a communication circuit comprising a plurality of communication interfaces comprising a first communication interface, a second communication interface, and a third communication interface, the method comprising:
receiving, from an external electronic device, information related to the external electronic device through the first communication interface;
selecting a communication interface to be used for tethering from among the plurality of communication interfaces on the basis of at least some of the received information; and
performing a tethering connection through the communication interface,
wherein selecting the communication interface comprises:
selecting the second communication interface from among the plurality of communication interfaces based on (1) at least one of a first battery level of the external electronic device or a second battery level of the electronic device being less than a first level and (2) transmission rate of an external network connected with the external electronic device less than a first rate, and
selecting the third communication interface from among the plurality of communication interfaces based on (1) both of the first battery level of the external electronic device and the second battery level of the electronic device being equal to or more than the first level and (2) transmission rate of the external network connected with the external electronic device being equal to or more than the first rate,
wherein the first battery level of the external electronic device and the transmission rate of the external network are included in the received information, and
wherein the first communication interface is a Bluetooth low energy (BLE) communication interface, the second communication interface is a Bluetooth (BT) communication interface, and the third communication interface is a Wi-Fi communication interface.

10. The method of claim 9, further comprising selecting a communication interface to be used for the tethering from among the plurality of communication interfaces on the basis of at least some of information related to the external electronic device, information related to the electronic device, or a combination thereof.

11. The method of claim 9, further comprising:
determining whether or not the tethering connection is disconnected; and
when the tethering connection is disconnected, performing an automatic tethering connection through the first communication interface, among the plurality of communication interfaces.

12. The method of claim 9, further comprising:
determining whether or not a switching criterion for switching the type of tethering connection is satisfied during the tethering connection;
when the switching criterion is satisfied, selecting another communication interface corresponding to the switching criterion from among the plurality of communication interfaces; and
interrupting the tethering connection and performing the tethering connection through the other communication interface.

* * * * *